US012747526B2

(12) United States Patent
Close et al.

(10) Patent No.: US 12,747,526 B2
(45) Date of Patent: Sep. 29, 2026

(54) SOFT ABSORBENT COFORM NONWOVEN WEB

(71) Applicant: KIMBERLY-CLARK WORLDWIDE, INC., Neenah, WI (US)

(72) Inventors: Kenneth B. Close, Neenah, WI (US); April Montoya Vaverka, Neenah, WI (US); Jeffrey Krueger, Neenah, WI (US); David Trebatoski, Neenah, WI (US); Cassidy A. Semkuley, Neenah, WI (US); Andres J. Garcia Parra, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 174 days.

(21) Appl. No.: 18/713,262

(22) PCT Filed: Dec. 16, 2021

(86) PCT No.: PCT/US2021/063707

§ 371 (c)(1),
(2) Date: May 24, 2024

(87) PCT Pub. No.: WO2023/113794

PCT Pub. Date: Jun. 22, 2023

(65) Prior Publication Data

US 2025/0027239 A1 Jan. 23, 2025

(51) Int. Cl.
*D04H 1/559* (2012.01)
*B32B 5/02* (2006.01)
(Continued)

(52) U.S. Cl.
CPC ............. *D04H 1/559* (2013.01); *B32B 5/022* (2013.01); *B32B 5/268* (2021.05); *D04H 1/4374* (2013.01);
(Continued)

(58) Field of Classification Search
CPC ................. A61F 13/53; B32B 2250/20; B32B 2262/0253; B32B 2307/536;
(Continued)

(56) References Cited

U.S. PATENT DOCUMENTS 4,100,324 A 7/1978 Anderson et al.
4,789,592 A 12/1988 Taniguchi et al.
(Continued)

FOREIGN PATENT DOCUMENTS

CN 1468334 A 1/2004
CN 102791914 A 11/2012
(Continued)

OTHER PUBLICATIONS

International Search Report and Written Opinion mailed Mar. 31, 2022, from International Application No. PCT/US2021/063707, 10 pages.
(Continued)

*Primary Examiner* — Lawrence D Ferguson
(74) *Attorney, Agent, or Firm* — Meunier Carlin & Curfman LLC

(57) ABSTRACT

Soft and strong nonwoven web materials and methods of formation are described. In one embodiment, a nonwoven web may comprise a first and second outer regions of meltblown polymer fibers and absorbent fibers, the meltblown fibers formed of first and second polymer components where the second polymer component comprises greater than 0% and less than or equal to 20% by weight of a total polymeric material content of the meltblown polymer fibers, and a central region disposed between the first and second outer regions and comprising meltblown polymer fibers and absorbent fibers, the meltblown fibers being different than the meltblown polymer fibers of the first and second outer regions and not comprising the second polymer component.

12 Claims, 8 Drawing Sheets

(51) Int. Cl.

| | |
|---|---|
| ***B32B 5/26*** | (2006.01) |
| ***D04H 1/4374*** | (2012.01) |
| ***D04H 1/4382*** | (2012.01) |
| ***D04H 1/56*** | (2006.01) |

(52) U.S. Cl.
CPC ........... *D04H 1/43828* (2020.05); *D04H 1/56* (2013.01); *B32B 2250/20* (2013.01); *B32B 2307/718* (2013.01); *B32B 2307/726* (2013.01)

(58) Field of Classification Search
CPC ........ B32B 2307/718; B32B 2307/726; B32B 5/022; B32B 5/268; D04H 1/4374; D04H 1/43825; D04H 1/43828; D04H 1/559; D04H 1/56; H04W 48/16; H04W 48/18; H04W 84/12; H04W 88/06
See application file for complete search history.

(56) References Cited

U.S. PATENT DOCUMENTS

| | | | |
|---|---|---|---|
| 4,795,668 | A | 1/1989 | Krueger et al. |
| 4,886,512 | A | 12/1989 | Damico et al. |
| 5,057,368 | A | 10/1991 | Largman et al. |
| 5,069,970 | A | 12/1991 | Largman et al. |
| 5,108,820 | A | 4/1992 | Kaneko et al. |
| 5,162,074 | A | 11/1992 | Hills |
| 5,277,976 | A | 1/1994 | Hogle et al. |
| 5,336,552 | A | 8/1994 | Strack et al. |
| 5,350,624 | A | 9/1994 | Georger et al. |
| 5,382,400 | A | 1/1995 | Pike et al. |
| 5,466,410 | A | 11/1995 | Hills |
| 5,508,102 | A | 4/1996 | Georger et al. |
| 5,558,659 | A | 9/1996 | Sherrod et al. |
| 5,649,916 | A | 7/1997 | DiPalma et al. |
| 5,935,883 | A | 8/1999 | Pike |
| 6,028,018 | A | 2/2000 | Amundson et al. |
| 6,110,158 | A | 8/2000 | Kielpikowski |
| 6,200,669 | B1 | 3/2001 | Marmon et al. |
| 6,474,967 | B1 | 11/2002 | Haynes et al. |
| 6,511,465 | B1 | 1/2003 | Freiburger et al. |
| 6,663,611 | B2 | 12/2003 | Blaney et al. |
| 6,888,044 | B2 | 5/2005 | Fell et al. |
| 7,168,932 | B2 | 1/2007 | Lassig et al. |
| 2003/0200991 | A1 | 10/2003 | Keck et al. |
| 2004/0060112 | A1 | 4/2004 | Fell et al. |
| 2007/0049153 | A1 | 3/2007 | Dunbar et al. |
| 2014/0044934 | A1 | 2/2014 | Bills et al. |
| 2017/0022643 | A1 | 1/2017 | Burt et al. |
| 2020/0362477 | A1 | 11/2020 | Chen et al. |
| 2021/0369511 | A1 | 12/2021 | Giovanni et al. |

FOREIGN PATENT DOCUMENTS

| | | |
|---|---|---|
| ES | 2459724 | 5/2014 |
| JP | 2012087450 A | 5/2012 |
| WO | 2014/086321 A1 | 6/2014 |

OTHER PUBLICATIONS

Office Action and English translation for Chinese Application No. 202180104875.4 dated Apr. 1, 2026.

SOFT ABSORBENT COFORM NONWOVEN WEB

CROSS-REFERENCE TO RELATED APPLICATIONS

This application is a United States National Phase Patent Application of International Patent Application Number PCT/US2021/063707, filed on Dec. 16, 2021, which is incorporated by reference herein in its entirety.

BACKGROUND OF THE INVENTION

Nonwoven webs formed as composites of a matrix of meltblown thermoplastic fibrous material and secondary fibrous material, sometimes called coform webs, have been used as an absorbent layer in a wide variety of applications, including absorbent articles, absorbent dry wipes, wet wipes, and mops. Many conventional coform webs employ meltblown thermoplastic fibrous material formed from polypropylene and/or polyethylene homopolymers. Where polyethylene homopolymers are utilized, the polyethylene content may provide for an increased softness of the coform webs but also contributes to a reduced strength. Continued improvements in coform webs' softness and strength are continually desired.

SUMMARY OF THE INVENTION

In a first embodiment, a nonwoven web material may comprise a first outer region comprising: first meltblown polymer fibers, the first meltblown polymer fibers comprising a first polymer component and a second polymer component, and absorbent fibers, wherein the second polymer component content of the first meltblown polymer fibers comprises greater than 0% and less than or equal to 20% by weight of a total polymeric material content of the first meltblown polymer fibers; a second outer region comprising: second meltblown polymer fibers, the second meltblown polymer fibers comprising a first polymer component and a second polymer component, and absorbent fibers, wherein the second polymer component content of the second meltblown polymer fibers comprises greater than 0% and less than or equal to 20% by weight of a total polymeric material content of the second meltblown polymer fibers; and a central region disposed between the first outer region and the second outer region, the central region comprising: third meltblown polymer fibers, the third meltblown polymer fibers being different than the first meltblown polymer fibers and the second meltblown polymer fibers and not comprising the second polymer component, and absorbent fibers.

In a further embodiment, a stratified coformed nonwoven web material having a thickness may comprise a first outer region comprising a combination of meltblown polymer fibers and absorbent fibers; a second outer region comprising a combination of meltblown polymer fibers and absorbent fibers; and a central region disposed between the first outer region and the second outer region, the central region comprising a combination of meltblown polymer fibers and absorbent fibers, wherein at least some of the meltblown polymer fibers comprise bicomponent meltblown polymer fibers and at least some of the meltblown polymer fibers comprise monocomponent meltblown polymer fibers, the bicomponent meltblown polymer fibers extending through less than the entire thickness of the stratified coformed nonwoven web.

In another embodiment, a stratified coform web material having an overall basis weight and may comprise a first coformed outer region comprising meltblown polymer fibers, the meltblown polymer fibers comprising bicomponent meltblown polymer fibers formed of a first polymer component and a second polymer component, the second polymer component present in an amount greater than 0% and less than or equal to 3% of the overall basis weight of the stratified coform web material and comprising less than or equal to 40% of a total polymeric content of the bicomponent meltblown polymer fibers in the first coformed outer region, and absorbent fibers; a second coformed outer region comprising: meltblown polymer fibers, the meltblown polymer fibers comprising bicomponent meltblown polymer fibers formed of a first polymer component and a second polymer component, the second polymer component present in an amount greater than 0% and less than or equal to 3% of the overall basis weight of the stratified coform web material and comprising less than or equal to 40% of a total polymeric content of the bicomponent meltblown polymer fibers in the second coformed outer region, and absorbent fibers; and a central coformed region disposed between the first coformed outer region and the second coformed outer region, the central coformed region having a basis weight greater than or equal to 40% and less than or equal to 60% of the overall basis weight of the stratified coform web material and comprising: meltblown polymer fibers, the meltblown polymer fibers comprising monocomponent meltblown polymer fibers, and absorbent fibers.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
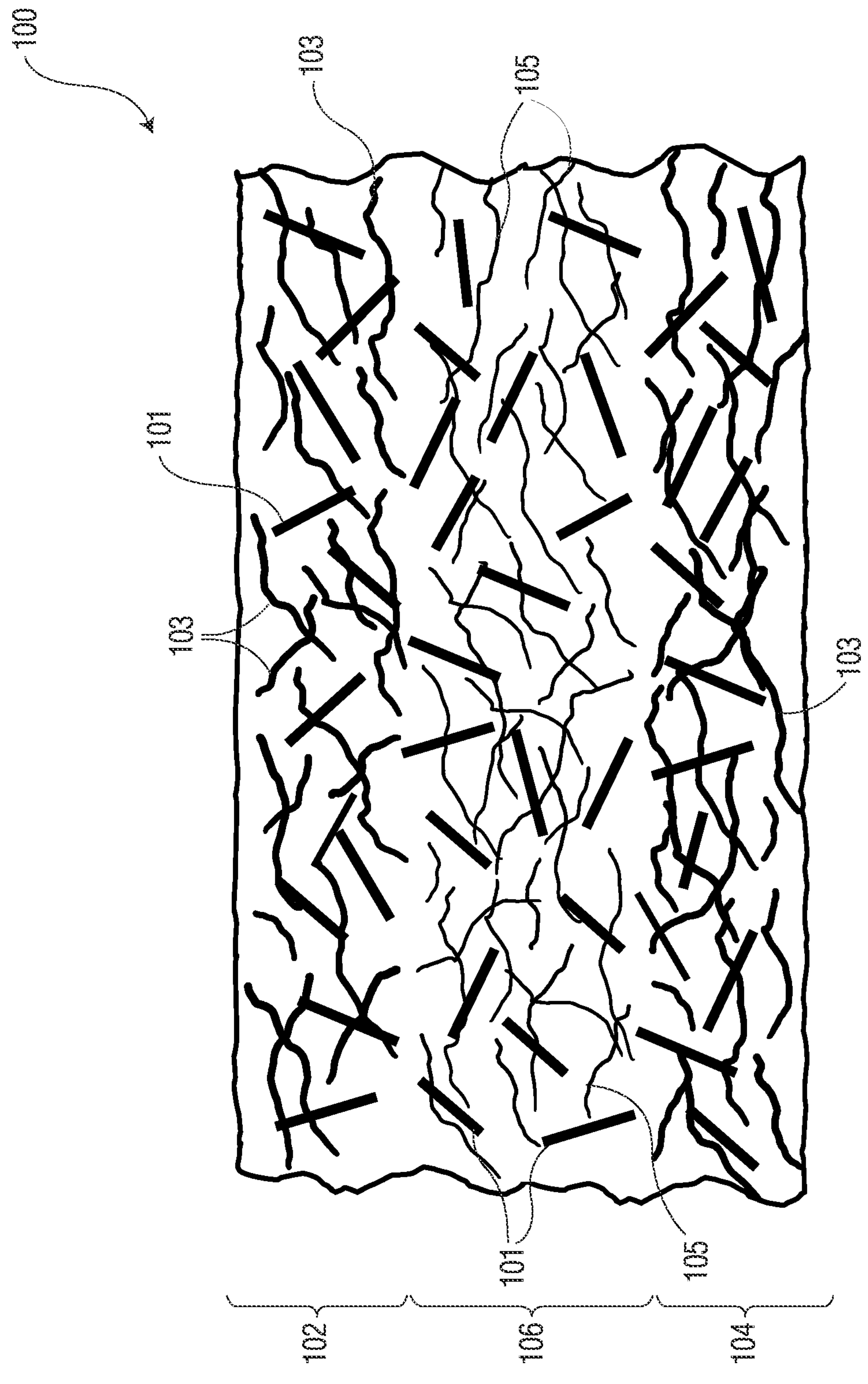
FIG. 1 is a schematic illustration of an exemplary cross-section of a nonwoven web, according to aspects of the present disclosure.

Repeat use of reference characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

As used herein, the term "nonwoven fabric or web" means a web having a structure of individual fibers or threads which are interlaid, but not in a regular or identifiable manner, as in a knitted fabric. It also includes foams and films that have been fibrillated, apertured or otherwise treated to impart fabric-like properties. Nonwoven fabrics or webs have been formed from many processes such as, for example, meltblowing processes, spunbonding processes, hydroentangled processes, and bonded carded web processes. The basis weight of nonwoven fabrics is usually expressed in ounces of material per square yard (osy) or grams per square meter (gsm), and the fiber diameters are usually expressed in μm.

As used herein, the term "microfibers" means small diameter fibers having an average diameter of not greater than about 75 μm, for example, having an average diameter of from about 0.5 μm to about 50 μm, or more particularly, having an average diameter of from about 2 μm to about 40 μm. Another frequently used expression of fiber diameter is denier, which is defined as grams per 9,000 meters of a fiber, and may be calculated as fiber diameter in μm squared, multiplied by the density in grams/cc, multiplied by 0.00707. A lower denier indicates a finer fiber and a higher denier indicates a thicker or heavier fiber. For example, a diameter of a polypropylene fiber given as 15 μm may be converted to denier by squaring, multiplying the result by 0.89 g/cc and multiplying by 0.00707. Thus, a 15 μm polypropylene fiber has a denier of about 1.42 ($15^2 \times 0.89 \times 0.00707 = 1.415$). Outside the United States, the unit of measurement is more commonly the "tex", which is defined as the grams per kilometer of fiber. Tex may be calculated as denier/9.

As used herein, the term "meltblown fibrous materials" means fibers formed by extruding a molten thermoplastic material through a plurality of fine, usually circular, die capillaries as molten threads or filaments into converging high velocity gas (for example, airstreams) which attenuate the filaments of molten thermoplastic material to reduce their diameter, which may be to microfiber diameter. Thereafter, the meltblown fibrous materials are carried by the high velocity gas stream and are deposited on a collecting surface to form a web of randomly dispersed meltblown fibrous materials. Meltblown fibrous materials are microfibers which may be continuous or discontinuous, and are generally smaller than 10 μm in average diameter.

As used herein, the term "polymer throughput" means the throughput of the polymer through the die and is specified in pounds of polymer melt per inch of die width per hour (pih) or grams of polymer melt per hole per minute (ghm). To calculate throughput in pih from units of ghm, multiply ghm by the number of fiber emitting holes per inch of fiber-forming die (holes/inch), then divide by 7.56.

The present disclosure is directed toward nonwoven webs combining thermoplastic fibrous material and secondary fibrous material-called a coform web herein—that achieves softness and strength combinations superior to previous coform webs. To form such coform webs, meltblown fibrous material is mixed within one or more secondary fibrous materials and/or particles. The mixtures are collected in the form of fibrous nonwoven webs, which may be bonded or treated to provide coherent nonwoven materials according to some embodiments, that take advantage of at least some of the properties of each component. These mixtures are referred to as "coform" materials because they are formed by combining two or more materials in the forming step into a single structure. Further details regarding such coform materials and processes are described herein.

The coform webs of the present disclosure include first meltblown fibers comprising a first polymer component and a second polymer component ("bicomponent fibers" herein, also called multicomponent fibers) and second meltblown fibers comprising a first homopolymer ("homogenous fibers" herein, also called monocomponent fibers). Although the term "bicomponent fibers" is used herein, it should not be understood to be limiting such fibers to comprising only two polymer components. Rather, such bicomponent fibers as used herein comprise at least two polymer components, but may comprise additional polymer components. Through the methods 200 and 300 described with respect to FIGS. 2 and 3, the bicomponent meltblown fibers and the homogenous meltblown fibers may be combined in a layered manner, along with secondary fibrous material, to produce a layered coform structure—an illustrative schematic cross-section of which can be seen with respect to FIG. 1.

The example cross-section of FIG. 1 shows the nonwoven web 100 having a first outer region 102, a second outer region 104, and a central region 106. The first outer region 102 and the second outer region 104 are each formed of both a secondary fibrous material—fibers 101 in the embodiment of FIG. 1—along with bicomponent meltblown fibers 103. The central region 106 is formed of secondary fibrous material, e.g. fibers 101, along with homogenous meltblown fibers 105. As depicted in FIG. 1, the fibers 101 are shown as the straight, flat-ended lines, the bicomponent meltblown fibers 103 are shown as the thicker squiggle lines, and the homogenous meltblown fibers 105 are shown as the thinner squiggle lines. It should be understood that these depictions are for illustrative purposes only. For example, the bicomponent meltblown fibers 103 and the homogenous meltblown fibers 105 may in reality be the same size. Additionally, the bicomponent meltblown fibers 103 and the homogenous meltblown fibers 105, within formed webs, may be disposed as longer, more continuous fibers than what is shown in FIG. 1. Further, there may be crossings or connections between some bicomponent meltblown fibers 103 and homogenous meltblown fibers 105. However, FIG. 1 should be understood to illustrate the general concept that the outer regions 102, 104 contain substantially higher concentrations of bicomponent meltblown fibers 103 while the central region 106 contains substantially higher concentrations of homogenous meltblown fibers 105. While such specific concentrations can be difficult to measure in formed webs 100, such concentrations can be gleaned from the formation processes of the webs 100.

In particular embodiments of the nonwoven web 100 of FIG. 1, it may be particularly advantageous for the web 100 to have an overall basis weight of between about 20 gsm and about 150 gsm. In more specific embodiments, the web 100 may have an overall basis weight of between about 50 gsm and about 125 gsm, or between about 50 gsm and about 80 gsm. In such embodiments, it may be preferable for the central region 106 to comprise between 20% and 80% of the overall basis weight of the web 100, or between about 30% and about 60% in other embodiments. Accordingly, the first outer region 102 and the second outer region 104 may comprise between about 80% and about 20%, or between about 70% and about 40% of the overall basis weight of the web 100.

The first outer region 102 and the second outer region 104 may have equal basis weights in some embodiments. For example, if the overall basis weight of the web 100 is 100 gsm, and the first and second outer regions 102, 104 have a combined basis weight of 50% of the overall basis weight, then each of the first outer region 102 and the second outer region 104 would have a basis weight of 25 gsm. In alternative embodiments, the basis weights of the first and second outer regions 102, 104 may be different. In these embodiments, the basis weight of the first outer region 102 or the second outer region 104 may be between about 35% and about 65% of the combined basis weight of the first and second outer regions 102, 104. As one illustrative example, if the nonwoven web 100 has a basis weight of 100 gsm, the first and second outer regions 102, 104 have a combined basis weight of 50% of the overall basis weight, and the first outer region 102 has a basis weight of 65% of the combined basis weight of the first and second outer regions 102, 104, then the first outer region 102 would have a basis weight of 65% of 50 gsm, which is 32.5 gsm. The second outer region 104 would have a basis weight of 17.5 gsm in this example.

Within each of the regions, 102, 104, and 106, basis weights of the components of the web 100 may be particularly important for driving the desired softness and strength properties of the web 100. For example, the central region 106 may advantageously be comprised of secondary fibrous material such as fibers 101 and homogenous meltblown fibers 105. Within the central region 106, the fibers 101 may be disposed at a basis weight of between about 55% and about 85% of the overall basis weight of the central region 106. Accordingly, the homogenous meltblown fibers 105 may be disposed at a basis weight of between about 15% and about 45% of the overall basis weight of the central region 106. In more particular embodiments, the fibers 101 may be disposed at a basis weight of between about 60% and about 75% of the overall basis weight of the central region 106. The homogenous meltblown fibers 105 would then be disposed at a basis weight of between about 25% and about 50% of the overall basis weight of the central region 106.

As described, the first and second outer regions 102, 104 may be advantageously comprised of both secondary fibrous material, e.g. fibers 101, and bicomponent meltblown fibers 103. Each of the first and second outer regions 102, 104 may have fibers 101 disposed at a basis weight of between about 50% and about 80% of the overall basis weight of the respective region 102, 104. More specifically, the first outer region 102 may have a basis weight of fibers 101 that is between about 55% and about 70% of the overall basis weight of the first outer region 102. Likewise, the second outer region 104 may have a basis weight of fibers 101 that is between about 50% and about 80%, or between about 55% and about 70%, of the overall basis weight of the second outer region 104. Accordingly, the first and second outer regions 102, 104 may each have bicomponent meltblown fibers 103 disposed at a basis weight of between about 20% and about 50% of the overall basis weight of the respective first and second outer regions 102, 104. In more particular embodiments, the first and second outer regions 102, 104 may each have bicomponent meltblown fibers 103 disposed at a basis weight of between about 30% and about 45% of the overall basis weight of the respective region 102, 104.

In at least some of these examples, the first and second outer regions 102, 104 may have meltblown fibers, e.g. the bicomponent meltblown fibers 103, disposed at a greater percent of the basis weight of the first and second outer regions 102, 104 than the meltblown fibers of the central region 106, e.g. the homogenous meltblown fibers 105, are disposed at percent of the basis weight of the central region 106. For example, the first and second outer regions 102, 104 may have meltblown fibers disposed at a basis weight of greater than or equal to about 25% of the overall basis weight of the first and second outer regions 102, 104, while the central region has meltblown fibers disposed at a basis weight of less than about 20% of the basis weight of the central region 106. In another example, the first and second outer regions 102, 104 may have meltblown fibers disposed at a basis weight of greater than or equal to about 30% of the overall basis weight of the first and second outer regions 102, 104, while the central region has meltblown fibers disposed at a basis weight of less than about 30% of the basis weight of the central region 106.

Strength and softness may be driven to a large degree by the amount and types of polymers used to form the homogenous meltblown fibers and the bicomponent meltblown fibers. In embodiments according to the present disclosure, a first polymer component may be utilized which has properties providing strength to the web 100. For example, the first polymer component may have properties which form strong meltblown fibers, such strong fibers providing strength to the web 100. The first polymer component may be utilized to form the homogenous meltblown fibers 105. In some embodiments, the first polymer component may be utilized as one component of the bicomponent meltblown fibers 103.

A second polymer component may be utilized which has properties providing softness to the web 100. For example, the second polymer component may have properties which provide a soft feel and therefore meltblown fibers formed of the second polymer component may provide a soft feel to the web 100. In some embodiments according to the present disclosure, the second polymer component may be utilized as one component of the bicomponent meltblown fibers 103. Accordingly, in some embodiments, the first polymer component and the second polymer component may be separate components of the bicomponent meltblown fibers 103. In other embodiments, the first polymer component may be utilized to form the homogenous meltblown fibers 105, the second polymer component may be utilized as one component of the bicomponent meltblown fibers 103, and a third polymer component may be utilized as another of the components of the bicomponent meltblown fibers 103. In any of these various embodiments, the first polymer component or the third polymer component would typically be utilized to provide a strength to the bicomponent meltblown fibers 103, while the second polymer component provides a soft feel to the bicomponent meltblown fibers 103.

Accordingly, the relative amounts of the first and second polymer components, or the first, second, and third polymer components may be a large driver overall strength and softness of the web 100. It has been found that beneficial amounts of a polymer component providing softness to the web 100, for example the second component in these described embodiments, are between 0.1% and 5% by weight of the overall weight of the nonwoven web 100. More specific embodiments may prefer the polymer component providing softness to the web 100 to be between 0.25% and 4%, or between 0.4% and 3%, or between 0.6% and 2.5% by weight of the overall weight of the nonwoven web 100. The polymer component or components providing strength to the nonwoven web 100, for example the first polymer component or a combination of the first polymer component and the third polymer component, may preferably be present in a combined amount between 20% and 40% by weight of the overall weight of the nonwoven web 100. In more specific embodiments, it may be preferred for the polymer component(s) providing strength to the nonwoven web to be present in an amount between 23% and 37%, or between 25% and 35%, or between 27% and 33% by weight of the overall weight of the nonwoven web 100.

Figure 5A:
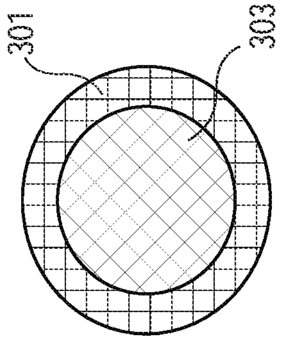
FIGS. 5A and 5B are schematic cross-section configurations of exemplary fibers which may be used to form nonwoven webs according to the present disclosure.
Figure 5B:
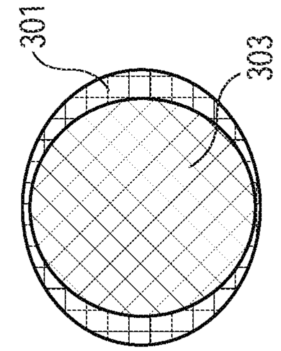
Figure 6:
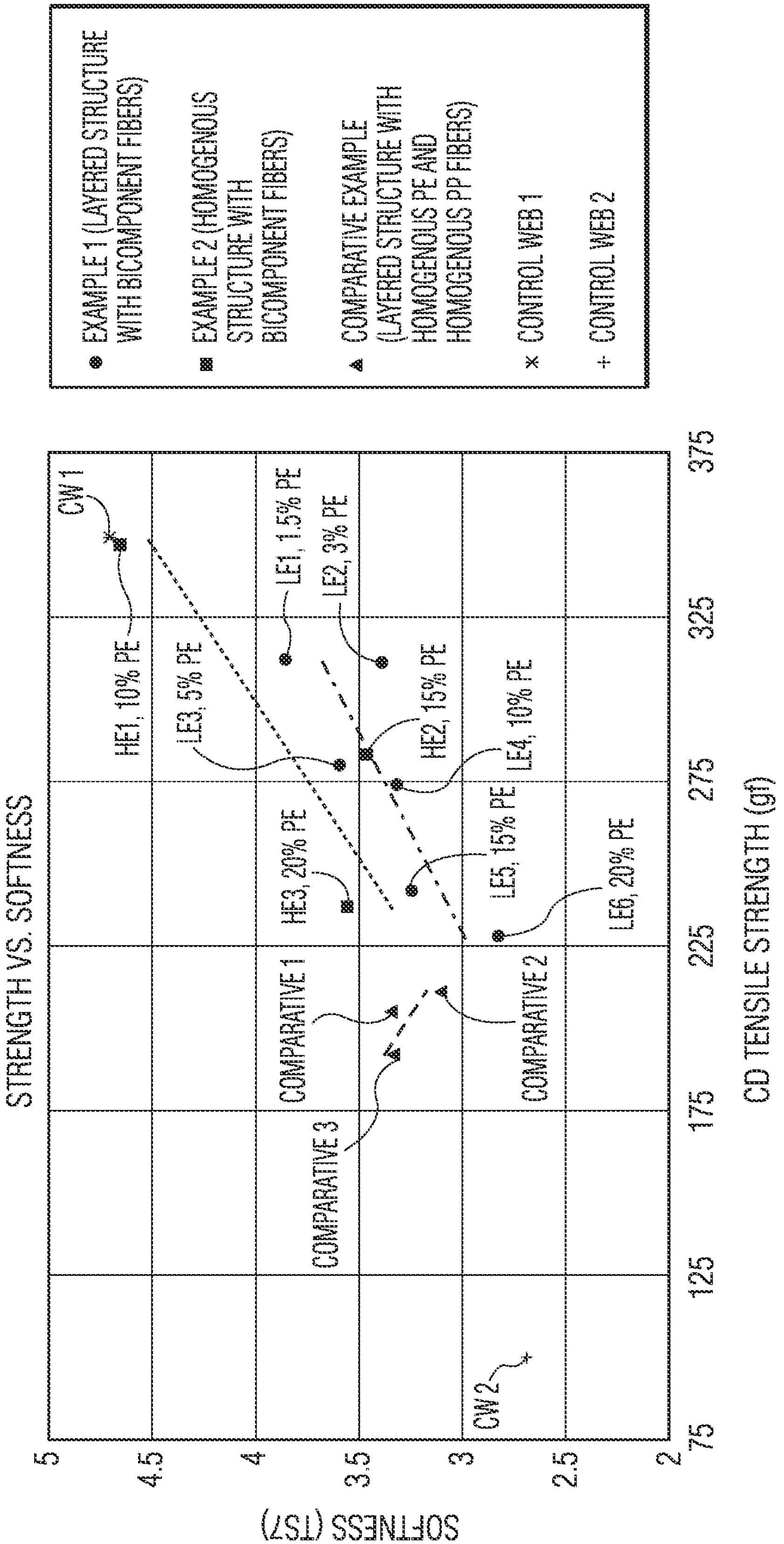
FIG. 6 is a graph illustrating strength and softness values for a variety of nonwoven webs, according to aspects of the present disclosure.

In at least some of the embodiments of the present disclosure, it may be particularly preferred to ensure that the polymer component or components providing strength to the web 100, referred to herein as the first or first and third polymer components, and the polymer component providing softness to the web 100, referred to herein as the second polymer component, are disposed in a particular manner within the bicomponent meltblown fibers 103. For example, it may be preferred that the first or third polymer component is disposed as an interior component of the bicomponent meltblown fibers 103, with the second polymer component disposed as an outer component of the bicomponent meltblown fibers 103. In particular embodiments of the present disclosure, it is preferred that the second polymer component substantially surrounds and covers the first or third polymer component of the bicomponent meltblown fibers 103—for example where the bicomponent meltblown fibers 103 have core-sheath or cat-eye cross section configurations as shown in FIGS. 5A and 5B with the second polymer component 301 surrounding the first (or third) polymer component 303.

The bicomponent meltblown fibers 103 may be formed with various forming cross-sections to achieve such a configuration. For example, the bicomponent meltblown fibers 103 may be formed having sheath-core or cat-eye forming cross-sections or other similar forming cross-sections where the second polymer component surrounds the first or third polymer component-such as an island-in-the-sea forming cross-section. Although, it should be understood that forming cross-sections which do not have the second polymer component surrounding the first or third polymer component are still within the scope of contemplated bicomponent meltblown fibers 103 of the present disclosure. For example, bicomponent meltblown fibers 103 having A-B-A forming cross-sections were found to perform particularly well, with the A component, e.g. the second polymer component, distending and wrapping the B component, e.g. the first or third polymer component, during the drawing/attenuation of the formed fibers as part of the meltblown process. In this manner, forming cross-sections which do not have the second polymer component surrounding the first polymer component can result in fibers with cross-section configurations where the second polymer does in fact substantially surround and cover the first or third polymer. Further forming cross-sections, such as A-B cross-sections, were found to produce beneficial performance results of the webs 100 of the present disclosure as well, but not to the extent of other meltblown fiber forming cross-sections that allow the second polymer component to more substantially surround and cover the first or third polymer component and to do so at lower overall amounts of the A component.

As used herein, the forming cross-sections are the cross-section configurations of the polymer components within the channel leading to an orifice of a die tip of a meltblowing die 216. Key considerations for forming such bicomponent meltblown fibers are described within U.S. Pat. No. 6,474,967 to Haynes, et al., and different fiber cross-sections and techniques to form such cross-sections of bicomponent meltblown fibers is described within U.S. Pat. No. 5,935,883 to Pike, which are incorporated herein in their entirety by reference. For example, U.S. Pat. No. 6,474,967 describes example dies and breaker plates useful in forming bicomponent meltblown fibers and further describes that it may be particularly important for the viscosities of the polymer components of the bicomponent meltblown fibers 103 to be sufficiently similar.

Further methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular cross-section shapes which may be useful according to aspects of the present disclosure are described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

In order to produce the best combinations of strength and softness of the web 100, it has been found that not only should the first (or first and third) and second polymer components be disposed in preferred amounts as described above, but the bicomponent meltblown fibers 103 should have particular ratios of the first or third polymer component and the second polymer component. In these embodiments, preferred amounts of the second polymer component are between about 1.5% and about 25% by weight of the bicomponent meltblown fibers 103. In more specific embodiments, the bicomponent meltblown fibers 103 comprise between about 1.5% and about 20%, or between about 1.5% and about 15%, or between about 1.5% and about 10% of the second polymer component by weight of the bicomponent meltblown fibers 103. It has been surprisingly found that bicomponent meltblown fibers 103 where the second polymer component comprises as little as 10% by weight of the bicomponent meltblown fibers 103, or even lower such as at 1.5%, can result in bicomponent meltblown fibers 103 where the second polymer component still provides relatively substantial coverage around the first or third polymer component—for example, forming a core-sheath cross-section configuration, whether formed with a core-sheath forming cross-section or such core-sheath cross-section configuration results from a different forming cross-section (such as an A-B-A forming cross-section, as one example). In this manner, bicomponent meltblown fibers 103 may be utilized having a beneficial softness feeling—with the second polymer component substantially covering and surrounding the first (or third) polymer component—as well as being as strong as possible with the first or third polymer component forming as much of the bicomponent meltblown fibers 103 as possible.

Homogenous Fibers

The homogenous meltblown fibers 105 of the present disclosure may preferably be meltblown fibers having diameters ranging between about 1 μm and 25 μm, or more particularly between about 2 μm and about 20 μm, or between about 2 μm and about 10 μm, or between about 2 μm and about 5 μm. Typically, such fibers are formed from a single extruder. The homogenous meltblown fibers 105 may generally be discontinuous fibers and have lengths such that their aspect ratios—e.g. a length to diameter ratio—is greater than about 1,000:1, or greater than 5,000:1, or greater than 7,500:1, or greater than 20,000;1, or greater than 20,000;1, or greater than about 30,000:1, or greater than about 50,000:1, or in some embodiments may be substantially continuous throughout the nonwoven web 100.

Bicomponent Fibers

The bicomponent meltblown fibers 103 of the present disclosure may preferably be meltblown fibers having diameters ranging between 1 μm and 25 μm, or more particularly between about 2 μm and about 20 μm, or between about 2 μm and about 10 μm, or between about 2 μm and about 5 μm. Typically, such fibers are formed from two or more extruders. The bicomponent fibers meltblown 103 may generally be discontinuous fibers and have lengths such that their aspect ratios—e.g. a length to diameter ratio—is greater than about 1,000:1, or greater than 5,000:1, or greater than 7,500:1, or greater than 20,000;1, or greater than 20,000;1, or greater than about 30,000:1, or greater than about 50,000:1, or in some embodiments may be substantially continuous throughout the nonwoven web 100.

Secondary Fibrous Material

The secondary fibrous material forming the fibers 101 may be selected from the group including one or more polyester fibers, polyamide fibers, cellulosic derived fibers such as, for example, rayon fibers and wood pulp fibers, multi-component fibers such as, for example, sheath-core multi-component fibers, natural fibers such as silk fibers, wool fibers or cotton fibers or electrically conductive fibers or blends of two or more of such secondary fibrous materials. Other types of secondary fibrous materials such as, for example, polyethylene fibers and polypropylene fibers, as well as blends of two or more of other types of secondary fibrous materials may be utilized. The secondary fibrous materials may be microfibers or the secondary fibrous materials may be macrofibers having an average diameter of from about 300 μm to about 1,000 μm.

In at least some embodiments, the secondary fibrous material forming the fibers 101 of the web 100 of the present disclosure may be absorbent fibers in some embodiments. As one example, such absorbent fibers may be pulp fibers formed by a variety of pulping processes, such as kraft pulp, sulfite pulp, thermomechanical pulp, etc. The pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and so forth. Hardwood fibers, such as eucalyptus, maple, birch, aspen, and so forth, can also be used. In certain instances, eucalyptus fibers may be particularly desired to increase the softness of the web. Eucalyptus fibers can also enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and so forth. In addition, in some instances, synthetic fibers can also be utilized.

Further absorbent material may be utilized in conjunction with pulp fibers, such as superabsorbent that is in the form fibers, particles, gels, etc. Generally speaking, superabsorbents are water-swellable materials capable of absorbing at least about 20 times its weight and, in some cases, at least about 30 times its weight in an aqueous solution containing 0.9 weight percent sodium chloride. The superabsorbent may be formed from natural, synthetic and modified natural polymers and materials. Examples of synthetic superabsorbent polymers include the alkali metal and ammonium salts of poly(acrylic acid) and poly(methacrylic acid), poly(acrylamides), poly(vinyl ethers), maleic anhydride copolymers with vinyl ethers and alpha-olefins, poly(vinyl pyrrolidone), poly(vinylmorpholinone), poly(vinyl alcohol), and mixtures and copolymers thereof. Further, superabsorbents include natural and modified natural polymers, such as hydrolyzed acrylonitrile-grafted starch, acrylic acid grafted starch, methyl cellulose, chitosan, carboxymethyl cellulose, hydroxypropyl cellulose, and the natural gums, such as alginates, xanthan gum, locust bean gum and so forth. Mixtures of natural and wholly or partially synthetic superabsorbent polymers may also be useful in the present invention.

First and Third Polymer Components

The first and third polymer components, as discussed above, are typically thermoplastics and are selected to provide the nonwoven web 100 with beneficial strength properties. Accordingly, the first and/or third polymer components may be selected from those polymer materials that produce strong polymeric fibers, such as polypropylene. Other exemplary polymer materials that may be suitable for the first and/or third polymer components of the nonwoven web 100 include polyethylene terephthalate (PET), polybutylene terephthalate (PBT), and nylon 6 (polyamide 6). Of course, still further suitable polymeric materials may be utilized for the first and/or third polymer components which have similar properties and/or produce fibers with similar properties as polypropylene or the other listed polymeric materials. In still further embodiments, the first and/or third polymer components may comprise a single of the above polymer materials or may be a combination of the polymer materials which are blended together and expelled through a single extruder.

As discussed in the various embodiments of the present disclosure, nonwoven web 100 may include only a first polymer component selected from the above polymeric materials which forms the homogenous meltblown fibers 105 and comprises one component of the bicomponent meltblown fibers 103. In the embodiments of web 100 having both a first polymeric component and a third polymeric component—with the first polymeric component forming the homogenous meltblown fibers 105 and the third polymeric component comprises one component of the bicomponent meltblown fibers 103—the first and third polymeric components may be selected from the above polymeric materials but may be different polymeric materials.

Second Polymer Components

The second polymer component, as discussed above, are typically thermoplastic and are selected to provide the nonwoven web 100 with beneficial softness properties. Accordingly, the second polymer component may be selected from those polymer materials that produce soft-feeling polymeric fibers, such as polyethylene. Of course, still further suitable polymeric materials may be utilized for the second polymer component which have similar properties and/or produce fibers with similar properties as polyethylene. Additionally, the second polymer component may comprise a single of the above polymer materials or may be a combination of such polymer materials which blend together expelled through a single extruder. Although, where part of bicomponent fibers, the extruder used to expel the second polymer component may operate in close coordination with a second extruder expelling another, different polymer component to form the bicomponent fibers.

Example Webs

Various example webs 100 were formed according to aspects of the present disclosure and tested to determine particular properties, in terms of softness, strength, and flexibility. First example webs were formed according to an alternative method 200 where the outer meltblowing dies 216 are connected to extruders 14, 14" and configured to form bicomponent meltblown fibers 220. The inner meltblowing dies 218 are connected to extruders 14' and configured to form homogenous meltblown fibers 221. Accordingly, in the formation of these first examples, labeled as layered examples (LE) 1-6 below, a first web structure was formed by a first forming apparatus (for example, forming apparatus 210*a*) comprising both bicomponent meltblown fibers 220 and homogenous meltblown fibers 221, as well as secondary fibrous material 232. The bicomponent meltblown fibers 220 were disposed at a higher concentration proximate the forming surface 254 due to the placement of the meltblowing die 214 relative to the air stream 234 of apparatus 210*a*. Then, a second mixture of bicomponent meltblown fibers 220 and homogenous meltblown fibers 221, as well as secondary fibrous material 232—formed by a second forming apparatus (for example, forming apparatus 210*b*)—was applied to this first web structure forming a final web structure—e.g. examples LE1-6. The second mixture was deposited such that the bicomponent meltblown fibers 220 were disposed at a higher concentration away from the first web structure due to the placement of the air stream 234 of apparatus 210*b*.

The examples LE1-6 were formed having a total basis weight of 70 gsm and the secondary fibrous material 232 utilized was pulp fluff. Polypropylene was used as the first polymer component, and polyethylene was used for the second polymer component, and the bicomponent fibers were formed having A-B-A forming cross-sections. No separate third polymer component was used. The basis weight of the first outer layer, formed by the first apparatus 210*a*, and the second outer layer, formed by the second apparatus 210*b*, each were approximately 25% of the overall basis weight of the example webs. The basis weight of the central layer, representing the material comprised of the mixture of homogenous meltblown fibers 221 with pulp fluff and formed by both the first and second apparatuses 210*a*, 210*b*, was approximately 50% of the overall basis weight of the example webs.

Particular characteristics and measured performance properties of the example webs, including LE1-6 example webs are shown below in TABLE 1. For example, TABLE 1 includes information about the total amount of secondary fibrous material (e.g. the pulp fluff), the first polymer component (e.g. the polypropylene, or PP), and the second polymer component (e.g. the polyethylene, or PE). TABLE 1 additionally reports on the weight percentage of the polyethylene (PE Weight %) within the bicomponent meltblown fibers 220. For example, a weight percent value of 5% indicates that the polyethylene component of the bicomponent meltblown fibers 220 forms approximately 5% of the total weight of the bicomponent meltblown fibers 220. While such a figure may be difficult to measure from the formed example webs LE1-6, such a weight percent value may be readily determined from the forming process conditions-such as the throughput of the first or third polymer component relative to the second polymer component in forming the bicomponent meltblown fibers 220. Stated a different way, the bicomponent meltblown fibers 220 comprise 5% polyethylene by weight (and thus, are 95% polypropylene by weight). The Total PE % of Web metric indicates the total amount of polyethylene present in the web as a % of the total weight of the web. For example, a web structure having a length of 10 cm and a width of 20 cm having a basis weight of 70 gsm would weigh 1.4 g. Accordingly, a Total PE % of Web value of 1.5% means the web contains a total of 1.4 g times 0.015=0.021 g of PE.

TABLE 2 reports on performance metrics of the example webs LE1-6. More specifically, the example webs LE1-6 were tested for strength according to the CDT Strength Test Method described herein, for softness according to the TS7 Softness Test Method described herein, and for flexibility according to the Cup Crush Test Method described herein. TABLE 2 also reports a Normalized Strength parameter. This Normalized Strength parameter is the CDT Strength value of the example web divided by the total polymer content of the example web. Since the total polymer content varies across the example and comparative webs, this metric may be useful in understanding unique strength properties of the example webs by seeing the CDT Strength values achieved relative to the amount of polymer content of the example webs—the polymer content being a main diver of the CDT strength value. For example, higher Normalized Strength values indicate a relatively higher CDT Strength value achieved for a given level of polymer content.

Second example webs were formed that are different from the web structure 100 of FIG. 1. These second example webs were formed having a homogenous composition of bicomponent meltblown fibers 220 and secondary fibrous material 232. These second example webs, labeled as HE1-3 below, utilized pulp fluff for the secondary fibrous material 232 as well as polypropylene and polyethylene for the first and second polymer components, respectively. The example webs HE1-3 were formed in a similar manner to the examples LE1-6, except that the examples HE1-3 were formed from a single apparatus, such as apparatus 210*a*. For the HE1-3 examples, the apparatus 210*a* had meltblowing dies 216 on both sides of the air stream 234 and each coupled to extruders 214, 214" and configured to form bicomponent meltblown fibers 220. The composite mixture of the bicomponent meltblown fibers 220 and the pulp fluff was collected on a forming surface 258 resulting in the example webs HE1-3. The example webs HE1-3 were formed at approximately 70 gsm with the pulp representing approximately 42 gsm of the overall 70 gsm basis weight and the bicomponent meltblown fibers 220 representing approximately 28 gsm of the overall 70 gsm basis weight.

Two example control webs were formed as well. The first control web (CW1) is a homogenous web of pulp fluff and homogenous meltblown fibers 221 comprising only polypropylene. The CW1 example was formed in a similar manner to the HE 1-3 example webs. The second control web (CW2) is a homogenous web of pulp fluff and homogenous meltblown fibers 221 comprising only polyethylene. The CW2 example was formed in a similar manner to the CW1 example web. The PE Weight % values of 0% and 100% for the CW1 and CW2 examples indicate that the CW1 example web was formed with no polyethylene such that the meltblown fibers were homogenous polypropylene fibers and that the CW2 example web was formed with no polypropylene such that the meltblown fibers were homogenous polyethylene fibers.

Comparative webs were formed as well and measured to determine the same strength, softness, and flexibility parameters as the LE1-6, CW1, CW2, and HE1-3 examples. These first comparative webs, labeled as Comparative 1-3 examples below, were formed according to aspects of U.S. Pat. No. 6,028,018 to Amundson et al., which describes a layered nonwoven web structure comprising outer layers of homogenous polyethylene fibers and a central layer of homogenous polypropylene fibers. These Comparative 1-3 webs were formed according to method 300 disclosed herein utilizing three separate forming apparatuses 310*a-c*. The first and third forming apparatuses 310*a*, 310*c* were configured to form homogenous polyethylene fibers (as indicated by the 100% PE Weight % values) and the second forming apparatus 310*b* was configured to form homogenous polypropylene fibers. The meltblown and pulp mixtures of the first and third forming apparatuses 310*a*, 310*c* (e.g. forming the outer areas of the formed webs) were 20 gsm for the Comparative 1 example web, and the first and third forming apparatuses 310*a*, 310*c* formed mixtures of 25 gsm for the Comparative 2 and 3 example webs.

It should be noted that example webs LE1-6 and HE1-3 were formed at a throughput of pounds of polymer melt per inch of die width per hour (PIH) of between 2.0-3.0 PIH. Although, similar webs have been made having similar properties as described with respect to TABLE 2 of between about 1.0 PIH and 6.0 PIH. Air temperatures were utilized of between 190° C. and 235° C. and pressures of between 20 kPa and 45 kPa. Melt temps of PP; resin dependant 420-430 380-390; based on melt temps of the resins the 380-440.

One ordinary skill in the art would understand to adjust the

For efficient high speed production, it is importance to balance attenuating air settings to maintain a continuous stream of meltblown Underwire Vacuum of:

Melt Temps:

Air Flow:

TABLE 1

| Code | Web Basis Wt. (gsm) | PE Weight % | Total PE % of Web | Pulp (gsm) | PE (gsm) | PP (gsm) |
|---|---|---|---|---|---|---|
| LE1 | 70 | 1.5% PE | 0.23% | 49 | 0.16 | 20.84 |
| LE2 | 70 | 3% PE | 0.46% | 49 | 0.32 | 20.69 |
| LE3 | 70 | 5% PE | 0.76% | 49.0 | 0.53 | 20.5 |
| LE4 | 70 | 10% PE | 1.50% | 49.0 | 1.05 | 20.0 |
| LE5 | 70 | 15% PE | 2.26% | 49.0 | 1.58 | 19.4 |
| LE6 | 70 | 20% PE | 3.00% | 49.0 | 2.10 | 18.9 |
| CW1 | 70 | 0% PE | 0% | 49 | 0 | 21 |
| CW2 | 70 | 100% PE | 30.0% | 49.0 | 21.0 | 0.00 |
| HE1 | 70 | 10% PE | 4.0% | 42.0 | 2.80 | 25.2 |
| HE2 | 70 | 15% PE | 6.0% | 42.0 | 4.20 | 23.8 |
| HE3 | 70 | 20% PE | 8.0% | 42.0 | 5.60 | 22.4 |
| Comparative 1 | 70 | 100% PE | 27.1% | 42.0 | 19.0 | 9.00 |
| Comparative 2 | 80 | 100% PE | 25.0% | 51.0 | 20.0 | 9.00 |
| Comparative 3 | 80 | 100% PE | 18.8% | 56.0 | 15.0 | 9.00 |

TABLE 2

| Code | CDT Strength (gf) | Normalized Strength (CDT (gf)/polymer gsm) | Softness (TS7) | Cup Crush Flexibility (gf*mm) |
|---|---|---|---|---|
| LE1 | 312 | 14.9 | 3.86 | 1240 |
| LE2 | 311 | 14.8 | 3.39 | 1358 |
| LE3 | 280 | 13.3 | 3.60 | 1085 |
| LE4 | 274 | 13.0 | 3.32 | 980 |
| LE5 | 242 | 11.5 | 3.25 | 930 |
| LE6 | 228 | 10.8 | 2.83 | 903 |
| CW1 | 349 | 16.6 | 4.71 | 1634 |

TABLE 2-continued

| Code | CDT Strength (gf) | Normalized Strength (CDT (gf)/polymer gsm) | Softness (TS7) | Cup Crush Flexibility (gf*mm) |
|---|---|---|---|---|
| CW2 | 100 | 4.8 | 2.69 | |
| HE1 | 347 | 12.4 | 4.66 | |
| HE2 | 283 | 10.1 | 3.47 | |
| HE3 | 237 | 8.5 | 3.56 | |
| Comparative 1 | 205 | 7.3 | 3.35 | |
| Comparative 2 | 211 | 7.3 | 3.11 | |
| Comparative 3 | 192 | 8.0 | 3.34 | |

As can be seen in the TABLES 1 and 2, the LE1-6 example webs were able to achieve softness and strength combinations superior to both the HE1-3 examples webs as well as the Comparative 1-3 example webs. For instance, the Comparative 1-3 example webs were unable to achieve a CDT Strength value of greater than 211 gf. Typical commercially acceptable CDT Strength values are greater than 225 gf, or even greater than 250 gf for some products. Conversely, all of the of the LE1-6 example webs were able to achieve CDT Strength values greater than 225 gf, with LE 1-4 achieving CDT Strength values greater than 250 gf. Additionally, while all of the HE1-3 example webs achieved CDT Strength values greater than 225 gf, the HE1-3 example webs performed inferior with respect to the TS7 Softness metric as compared to the LE1-6 example webs.

Although the LE1-6 examples webs achieved both strength and softness combinations superior to the Comparative 1-3 examples webs and the HE1-3 example webs, it may be advantageous to utilize webs similar in construction to the HE1-3 example webs in some circumstances. For instance, HE2 had a higher CDT Strength value and only a slightly lower TS7 Softness value than the LE5 example web, with both the LE5 and H2 example webs utilizing bicomponent fibers 103 having a 15% weight percentage of polyethylene. Additionally, although LE2 performed superior to HE2 in both strength and softness, other considerations such as processability and the like may make HE2 more preferable in some instances.

The Normalized Strength parameter also provides indication of the uniqueness of the LE1-6 example webs. For instance, the LE1-6 example webs were all able to achieve higher Normalized Strength values relative to the Comparative 1-3 example webs and almost all were able to achieve Normalized Strength values greater than the HE1-3 example webs. In particular, each of the LE4-6 example webs were able to achieve higher Normalized Strength values than corresponding HE1-3 example webs having the same PE Weight % values. This indicate that the LE1-6 example webs (and particularly the LE4-6 example webs) are able to achieve higher strengths at given polymer levels as compared to alternative web structures, allowing for relatively less polymer content in web structures according to the LE1-6 example webs to achieve a desired strength target.

Example Embodiments

According to first example embodiments of nonwoven web 100 of the present disclosure, the nonwoven web 100 has an overall basis weight of between about 50 gsm and about 80 gsm with the absorbent material comprising between about 60% and about 80% of the overall basis weight of the web 100. The homogenous fibers 105 comprises between about 17% and about 37% of the overall basis weight of the web 100, and the bicomponent fibers 103 comprise between about 3% and about 20% of the overall basis weight of the web 100.

In these first example embodiments, the homogenous fibers 105 are formed of a first polymer component. The bicomponent fibers 103 are formed of a second polymer component and either the first polymer component or a third polymer component. The total content of the second polymer component within the first example embodiments of the web 100 is between about 0.2% and about 5% of the total weight of the web 100. In more specific embodiments, the total content of the second polymer component is between about 0.2% and about 4%, or between about 0.2% and about 3%, or between about 0.2% and about 2.5% of the total weight of the web 100. Accordingly, a total weight of the combined first polymer component and the third polymer component (if any) is between about 95% and about 99.8%, or between about 96% and about 99.8%, or between about 97% and about 99.8%, or between about 97.5% and about 99.8% of the total weight of the web 100.

Further, the second polymer component comprises between about 1.5% and about 25% of the total weight of the bicomponent fibers 103. In more specific examples of these first embodiments, the second polymer component comprises between about 1.5% and about 20% or between about 1.5% and about 15% of the total weight of the bicomponent fibers 103. Accordingly, the first polymer component or the third polymer component comprises between about 75% and about 98.5%, or between about 80% and about 98.5%, or between about 85% and about 98.5% of the total weight of the bicomponent fibers 103.

These first example webs can have CDT Strength values of greater than or equal to about 228 gf, or greater than or equal to about 274 gf, or greater than or equal to about 311 gf, or between about 228 gf and about 312 gf, or between about 242 gf and about 312 gf, or between about 274 gf and about 312 gf, or between about 280 gf and about 312 gf. Additionally, in combination with these CDT Strength values, these example webs can have TS7 Softness values of less than or equal to about 3.86, or less than or equal to about 3.60, or less than or equal to about 3.39, or less than or equal to about 3.25, or between about 3.86 and about 2.83, or between about 3.60 and about 2.83. More particular of these examples may have CDT Strength values between about 228 gf and about 312 gf and TS7 Softness values between about 2.83 and about 3.86. In even more particular examples, the CDT Strength values may be between 228 gf and 311 gf with TS7 Softness values between about 2.83 and about 3.60, or the CDT Strength values may be between about 242 gf and about 280 gf with TS7 Softness values between about 2.83 and about 3.60. In combination with any of these softness and strength values, these first examples may additionally have Cup Crush Flexibility values of between about 903 gf*mm and about 1358 gf*mm, or between about 903 gf*mm and about 1240 gf*mm, or between about 903 gf*mm and about 1085 gf*mm (lower numbers representing more flexibility).

According to second example embodiments of nonwoven web 100 of the present disclosure, the nonwoven web 100 has an overall basis weight of between about 80 gsm and about 120 gsm with the absorbent material comprising between about 65% and about 85% of the overall basis weight of the web 100. The homogenous fibers 105 comprises between about 12.5% and about 33% of the overall basis weight of the web 100, and the bicomponent fibers 103 comprise between about 2.5% and about 17.5% of the overall basis weight of the web 100.

In these second example embodiments, the homogenous fibers 105 are formed of a first polymer component. The bicomponent fibers 103 are formed of a second polymer component and either the first polymer component or a third polymer component. The total content of the second polymer component within the first example embodiments of the web 100 is between about 0.2% and about 3.5% of the total weight of the web 100. In more specific embodiments, the total content of the second polymer component is between about 0.2% and about 3%, or between about 0.2% and about 2.5%, or between about 0.2% and about 2.0% of the total weight of the web 100. Accordingly, a total weight of the combined first polymer component and the third polymer component (if any) is between about 96.5% and about 99.8%, or between about 97% and about 99.8%, or between about 97.5% and about 99.8%, or between about 98% and about 99.8% of the total weight of the web 100.

Further, the second polymer component comprises between about 1.5% and about 25% of the total weight of the bicomponent fibers 103. In more specific examples of these first embodiments, the second polymer component comprises between about 1.5% and about 20% or between about 1.5% and about 15% of the total weight of the bicomponent fibers 103. Accordingly, the first polymer component or the third polymer component comprises between about 75% and about 98.5%, or between about 80% and about 98.5%, or between about 85% and about 98.5% of the total weight of the bicomponent fibers 103.

According to third example embodiments of nonwoven web 100 of the present disclosure, the nonwoven web 100 has an overall basis weight of between 20 gsm and 50 gsm with the absorbent material comprising between about 50% and about 70% of the overall basis weight of the web 100. The homogenous fibers 105 comprises between about 25% and about 45% of the overall basis weight of the web 100, and the bicomponent fibers 103 comprise between about 5% and about 25% of the overall basis weight of the web 100.

In these second example embodiments, the homogenous fibers 105 are formed of a first polymer component. The bicomponent fibers 103 are formed of a second polymer component and either the first polymer component or a third polymer component. The total content of the second polymer component within the first example embodiments of the web 100 is between about 1.0% and about 7.0% of the total weight of the web 100. In more specific embodiments, the total content of the second polymer component is between about 1.5% and about 7.0%, or between about 2.0% and about 7.0%, or between about 2.5% and about 7.0% of the total weight of the web 100. Accordingly, a total weight of the combined first polymer component and the third polymer component (if any) is between about 93% and about 99%, or between about 93% and about 98.5%, or between about 93% and about 98%, or between about 93% and about 97.5% of the total weight of the web 100.

Further, the second polymer component comprises between about 1.5% and about 25% of the total weight of the bicomponent fibers 103. In more specific examples of these first embodiments, the second polymer component comprises between about 1.5% and about 20% or between about 1.5% and about 15% of the total weight of the bicomponent fibers 103. Accordingly, the first polymer component or the third polymer component comprises between about 75% and about 98.5%, or between about 80% and about 98.5%, or between about 85% and about 98.5% of the total weight of the bicomponent fibers 103.

According to fourth example embodiments of nonwoven web 100 of the present disclosure, the nonwoven web 100 has an overall basis weight of between about 50 gsm and about 80 gsm with the absorbent material comprising between about 60% and about 75% of the overall basis weight of the web 100. The fourth example embodiments have no homogenous fibers 105 and have bicomponent fibers 103 disposed in a homogenous manner through the nonwoven web 100. In these fourth example embodiments, the bicomponent fibers 103 comprise between about 25% and about 40% of the overall basis weight of the web 100.

In these fourth example embodiments, the bicomponent fibers 103 are formed of a first polymer component and a second polymer component. The total content of the second polymer component within the fourth example embodiments of the web 100 is between about 2% and about 15% of the total weight of the web 100. In more specific embodiments, the total content of the second polymer component is between about 3% and about 12.5%, or between about 4% and about 10%, or between about 4% and about 8% of the total weight of the web 100. Accordingly, a total weight of the first polymer component is between about 85% and about 98%, or between about 87.5% and about 97%, or between about 90% and about 96%, or between about 92% and about 96% of the total weight of the web 100.

Further, the second polymer component comprises between about 5% and about 30% of the total weight of the bicomponent fibers 103. In more specific examples of these first embodiments, the second polymer component comprises between about 7.5% and about 25% or between about 10% and about 20% of the total weight of the bicomponent fibers 103. Accordingly, the first polymer component or the third polymer component comprises between about 70% and about 95%, or between about 75% and about 92.5%, or between about 80% and about 90% of the total weight of the bicomponent fibers 103.

These fourth example webs can have CDT Strength values of greater than or equal to about 237 gf or greater than or equal to about 283 gf, or between about 237 gf and about 347 gf, or between about 237 gf and about 283 gf, or between about 283 gf and about 347 gf. Additionally, in combination with these CDT Strength values, these example webs can have TS7 Softness values of less than or equal to about 4.66, or less than or equal to about 3.56, or between about 4.66 and about 3.47, or between about 4.66 and about 3.56, or between about 3.27 and about 3.56. More particular of these examples may have CDT Strength values between about 237 gf and about 283 gf and TS7 Softness values between about 3.47 and about 3.56. In even more particular examples, the CDT Strength values may be between about 283 gf and about 347 gf with TS7 Softness values between about 3.47 and about 4.66.

Web Formation

The coform web 100 according to the present disclosure is generally made by a process in which at least one meltblown die head (e.g., two) is arranged near a chute through which the absorbent material is added while the web forms. Some examples of such coform techniques are disclosed in U.S. Pat. No. 4,100,324 to Anderson, et al.; U.S. Pat. No. 5,350,624 to Georger, et al.; and 5,508,102 to Georger, et al., as well as U.S. Patent Application Publication Nos. 2003/0200991 to Keck, et al. and 2007/0049153 to Dunbar, et al., all of which are incorporated herein in their entirety by reference thereto for all purposes.

Figure 2:
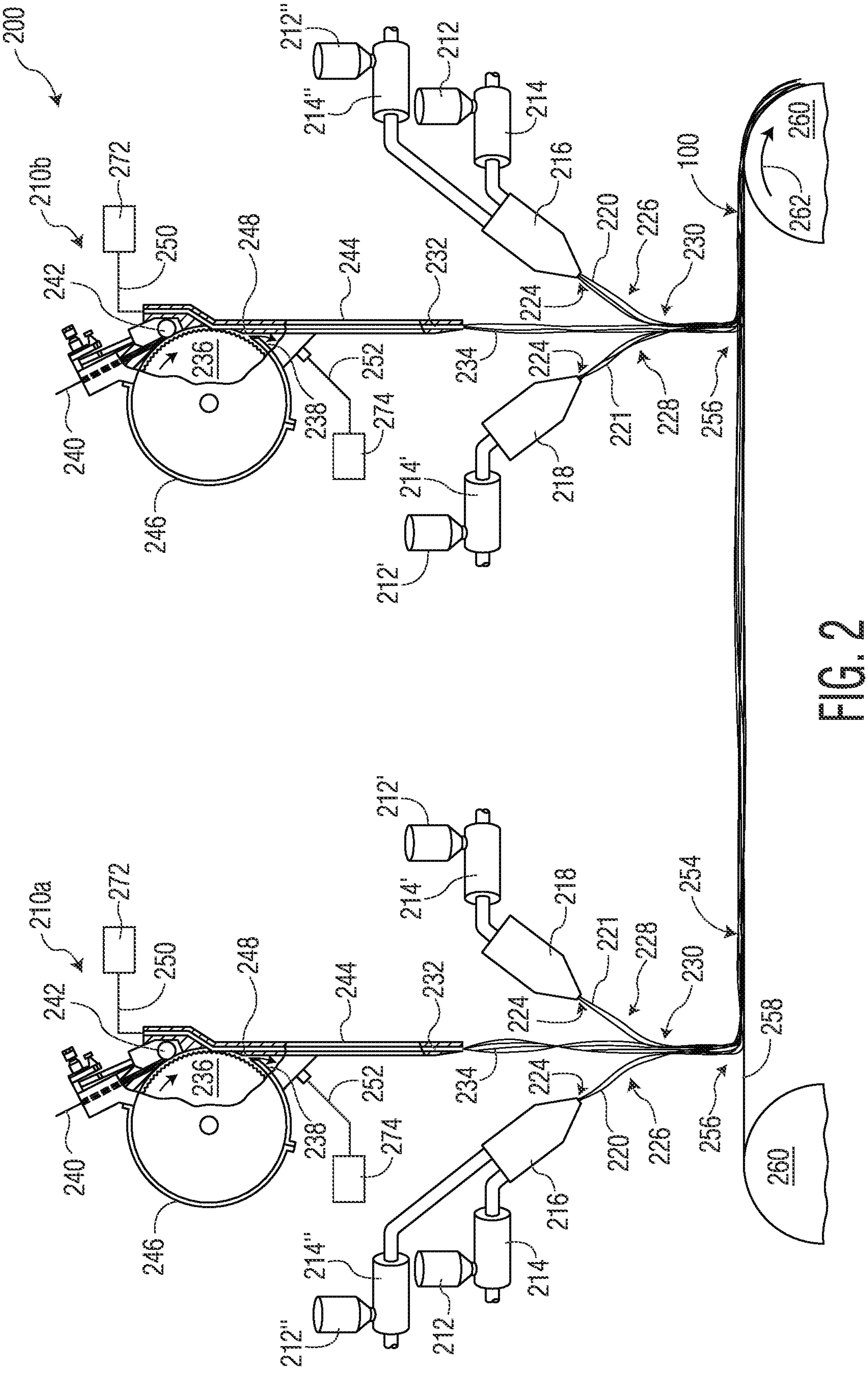
FIG. 2 is a schematic illustration an embodiment of a method for forming nonwoven webs of the present disclosure.

Referring to FIG. 2, an exemplary method 200 for forming exemplary webs 100 according to the present disclosure is depicted. Method 200 includes a first apparatus **210*a* for forming a coform web of the present invention. In this embodiment, the apparatus 210*a* includes a pellet hopper 212, 212', 212" of an extruder 214, 214', 214", respectively, into which a polymer component or polymer component blend may be introduced. The extruders 214, 214', 214", each have an extrusion screw (not shown), which is driven by a conventional drive motor (not shown). As the polymer component advances through the extruders 214, 214', 214", it is progressively heated to a molten state due to rotation of the extrusion screw by the drive motor. Heating may be accomplished in a plurality of discrete steps with its temperature being gradually elevated as it advances through discrete heating zones of the extruders 214, 214', 214" toward two meltblowing dies 216 and 218, respectively. The meltblowing dies 216 and 218** may be yet another heating zone where the temperature of the polymer component is maintained at an elevated level for extrusion.

Each meltblowing die 216 and 218 is configured so that two streams of attenuating gas per die configuration converge to form a single stream of gas which entrains and attenuates molten polymer threads 220 as they exit small holes or orifices 224 in each meltblowing die. The molten polymer threads 220 are formed into fibers-which may be microfibers depending upon the degree of attenuation—of a small diameter which is usually less than the diameter of the orifices 224. Thus, each meltblowing die 216 and 218 has a corresponding single stream of gas 226 and 228 containing entrained meltblown fibers formed of polymer components.

Figure 4:
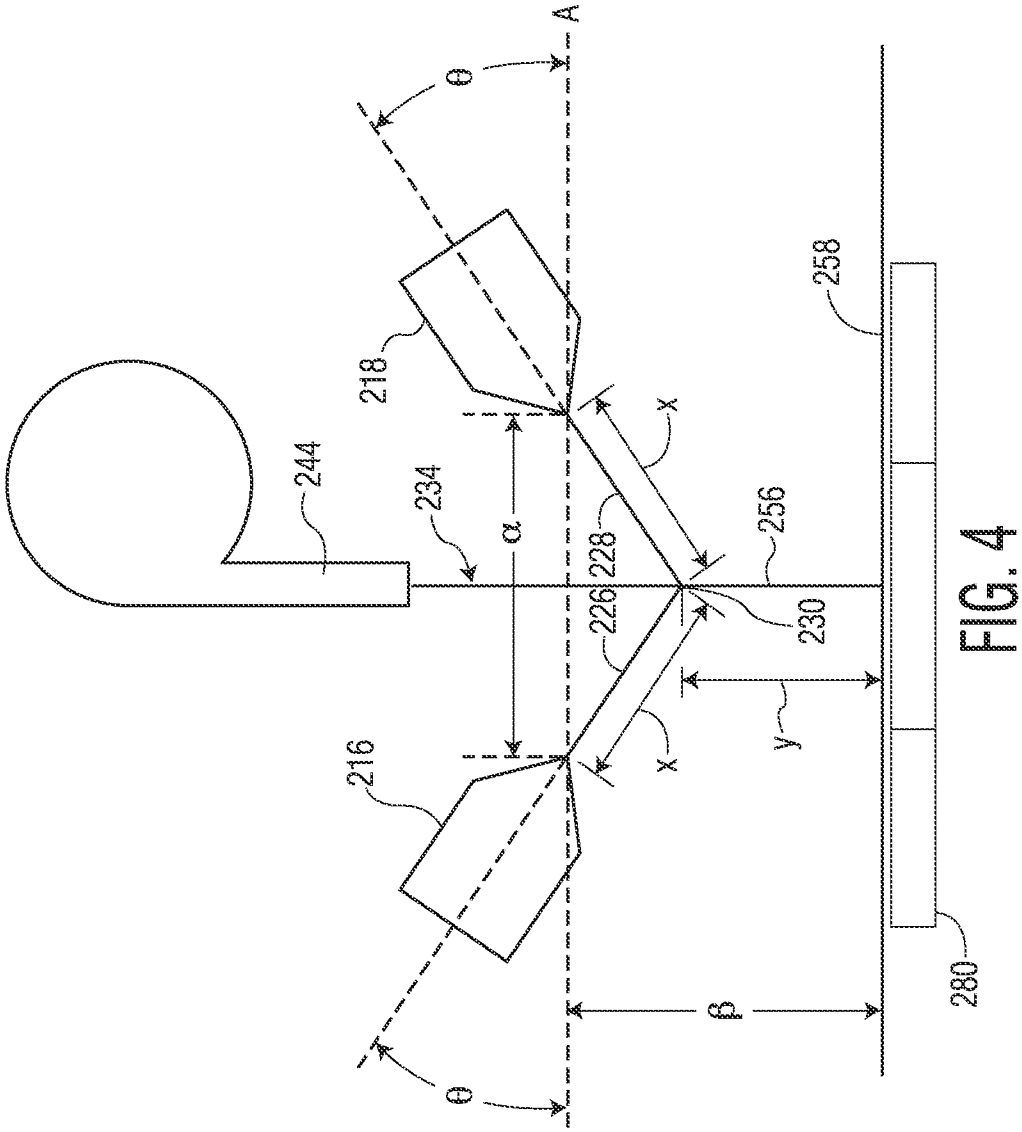
FIG. 4 is an illustration of certain features of a nonwoven web forming apparatus as shown in FIGS. 2 and 3.

The gas streams 226 and 228 containing meltblown polymer fibers (for example, the bicomponent meltblown fibers 103 and/or the homogenous meltblown fibers 105) are aligned to converge at an impingement zone 230. Typically, the meltblowing dies 216 and 218 are arranged at a certain angle with respect to the forming surface, such as described in U.S. Pat. Nos. 5,508,102 and 5,350,624 to Georger et al. Referring to FIG. 4, for example, the meltblown dies 216 and 218 may be oriented at an angle θ as measured from a plane "A" tangent to the two dies 216 and 218. As shown, the plane "A" is generally parallel to the forming surface 258 (FIG. 2). Typically, each die 216 and 218 is set at an angle ranging from about 30 to about 75 degrees, in further embodiments from about 35° to about 60°, and in even further embodiments from about 40° to about 55°. The dies 216 and 218 may be oriented at the same or different angles. In fact, the texture of the coform web may actually be enhanced by orienting one die at an angle different than another die.

Referring to FIG. 4, the dies 216 and 218 are separated by a distance α. Generally speaking, distance α may range up to about 41 cm (16 in). In some aspects, α may range from about 13 cm (5 in) to about 25 cm (10 in). In other aspects, a may range from about 15 cm (6 in) to about 21 cm (8 in).

Importantly, the distance α between the meltblowing dies and the angle θ of each meltblowing die determines location of the formation zone 230.

The distance from the formation zone 230 to the tip of each meltblowing die (i.e., distance X) should be set to minimize dispersion of each primary air stream 226 and 228 of fibers. For example, this distance may range up to about 41 cm (16 in). Desirably, this distance should be greater than 6 cm (2.5 in). For example, for distances X in the range of about 6 cm (2.5 in) to 16 cm (6 in) the distance from the tip of each meltblowing die arrangement to the formation zone 230 can be determined from the separation between the die tips a and the die angle θ utilizing the formula:

$$X = \alpha/(2\cos\theta)$$

Generally speaking, the dispersion of the stream 256 may be minimized by selecting a proper vertical forming distance (i.e., distance β) before the stream 256 contacts the forming surface 258. β is the distance from the tips of the meltblowing die 216, 218 and to the forming surface 258. A shorter vertical forming distance is generally desirable for minimizing dispersion. This must be balanced by the need for the extruded fibers to solidify from their tacky, semi-molten state before contacting the forming surface 258. For example, the vertical forming distance β may range from about 7 cm (3 in) to about 38 cm (15 in) from the meltblown die tip. Desirably, this vertical distance β may be about 10 cm (4 in) to about 28 cm (11 in) from the die tip.

An important component of the vertical forming distance β is the distance between the formation zone 230 and the forming surface 258 (i.e., distance Y). The formation zone 230 should be located so that the integrated streams have only a minimum distance (Y) to travel to reach the forming surface 258 to minimize dispersion of the entrained meltblown fibers. For example, the distance (Y) from the formation zone to the forming surface may range up to about 31 cm (12 in). Desirably, the distance (Y) from the impingement point to the forming surface may range from about 5 cm (3 in) to about 18 cm (7 in) inches. The distance from the formation zone 230 and the forming surface 258 can be determined from the vertical forming distance β, the separation between the die tips (B) and the die angle (θ) utilizing the formula:

$$Y = \beta - ((\alpha/2) * \cos\theta)$$

Gas entrained secondary fibrous materials are introduced into the formation zone 230 via a stream 234 emanating from a nozzle 244. Generally speaking, the nozzle 244 is positioned so that its vertical axis is substantially perpendicular to the forming surface 258.

In some situations, it may be desirable to cool the secondary air stream 234. Cooling the secondary air stream 234 could accelerate the quenching of the molten or tacky meltblown fibers and provide for shorter distances between the meltblowing die tip and the forming surface 258 which could be used to minimize fiber dispersion. For example, the temperature of the secondary air stream 234 may be cooled to about 65 to about 85 degrees Fahrenheit.

By balancing the streams of meltblown fibers 226 and 228 and secondary air stream 234, the desired die angles θ of the meltblowing dies, the vertical forming distance (B), the distance between the meltblowing die tips (α), the distance between the formation zone and the meltblowing die tips (X) and the distance between the formation zone and the forming surface (Y), it is possible to provide a controlled integration of secondary fibrous materials within the meltblown fiber streams.

Referring again to FIG. 2, secondary fibrous material 232 are added to the two streams 226 and 228 of meltblown polymer fibers 220 and 221, respectively, and at the impingement zone 230, forming a turbulent mixing of the streams 226, 228, and 234. Introduction of the secondary fibrous material 232 into the two streams 226 and 228 of meltblown polymer fibers 220 and 221, respectively, to form an integrated air stream is designed to produce a graduated distribution of secondary fibrous material 232 within the combined streams 226 and 228 of meltblown fibers. This may be accomplished by merging a secondary gas stream 234 containing the secondary fibrous material 232 between the two streams 226 and 228 of meltblown polymer fibers 220 and 221 so that all three gas streams converge in a controlled manner. Because they remain relatively tacky and semi-molten after formation, the meltblown polymer fibers 220 and 221 may simultaneously adhere and entangle with the secondary fibrous material 232 upon contact therewith to form a coherent nonwoven structure.

To accomplish the merger of the fibers, any conventional equipment may be employed, such as a picker roll 236 arrangement having a plurality of teeth 238 adapted to separate a mat or batt 240 of secondary fibers into the individual fibrous material. The mat or batt of secondary fibrous materials 240 which is fed to the picker roll 236 may be a sheet of pulp fibers (if a two-component mixture of polymer fibers and secondary pulp fibers is desired), a mat of staple fibers (if a two-component mixture of polymer fibers and secondary staple fibers is desired) or both a sheet of pulp fibers and a mat of staple fibers (if a three-component mixture of polymer fibers, secondary staple fibers and secondary pulp fibers is desired).

When employed, the sheets or mats 240 of secondary fibrous materials 232 are fed to the picker roll 236 by a roller arrangement 242. After the teeth 238 of the picker roll 236 have separated the mat of fibers into separate secondary fibrous materials 232, the individual fibers are conveyed toward the two streams 226 and 228 of meltblown polymer fibers 220 and 221 through a nozzle 244. A housing 246 encloses the picker roll 236 and provides a passageway or gap 248 between the housing 246 and the surface of the teeth 238 of the picker roll 236. A gas, for example, air, is supplied to the passageway or gap 248 between the surface of the picker roll 236 and the housing 246 by way of a gas duct 250.

The gas duct 250 may enter the passageway or gap 248 at the junction 252 of the nozzle 244 and the gap 248. In exemplary aspects, dual circular manifolds are used as a dilution air fan 272 providing uniform air distribution that delivers air into the gas duct 250. The gas is supplied in sufficient quantity to serve as a medium for conveying the secondary fibrous material 232 through the nozzle 244. The gas supplied from the duct 250 also serves as an aid in removing the secondary fibrous material 232 from the teeth 238 of the picker roll 236. It is contemplated that additives and/or other materials may be added to or entrained in the gas stream to treat the secondary fibrous material 232.

A separate stripper air fan 274 is utilized to provide a secondary stripper air flow entering the system at the junction 252 to help remove the secondary fibrous materials 232 from the teeth 238 of the picker roll 236. Separate dilution air fans 272 and stripper air fans 274 are utilized to allow for operators to balance the stripper air flow allowing for optimum fiber release off of the teeth 238 and an increase in the flowrate of the secondary air stream 234.

Generally speaking, the individual secondary fibrous materials 232 are conveyed through the nozzle 244 at about the velocity at which the secondary fibrous materials 232 leave the teeth 238 of the picker roll 236. In other words, the secondary fibrous materials 232, upon leaving the teeth 238 of the picker roll 236 and entering the nozzle 244 generally maintain their velocity in both magnitude and direction from the point where they left the teeth 238 of the picker roll 236. Such an arrangement, which is discussed in more detail in U.S. Pat. No. 4,100,324 to Anderson, et al.

If desired, the velocity of the secondary gas stream 234 may be adjusted to achieve coform structures of different properties. For example, when the velocity of the secondary gas stream is adjusted so that it is greater than the velocity of each stream 226 and 228 of meltblown polymer fibers 220 and 221 upon contact at the impingement zone 230, the absorbent fibers 232 are incorporated in the coform nonwoven web in a gradient structure. That is, the secondary fibrous material 232 have a higher concentration between the outer surfaces of the coform nonwoven web than at the outer surfaces. On the other hand, when the velocity of the secondary gas stream 234 is less than the velocity of each stream 226 and 228 of meltblown polymer fibers 220 and 221 upon contact at the impingement zone 230, the secondary fibrous material 232 are incorporated in the coform nonwoven web in a substantially homogenous fashion. That is, the concentration of the secondary fibrous material 232 is substantially the same throughout the coform nonwoven web. This is because the low-speed stream of secondary fibrous material 232 is drawn into a high-speed stream of meltblown polymer fibers to enhance turbulent mixing which results in a consistent distribution of the secondary fibrous material 232.

To convert the composite stream 256 of meltblown polymer fibers 220, 221 and secondary fibrous material 232 into a coform nonwoven structure 254, a collecting device is located in the path of the composite stream 256. The collecting device may be a forming surface 258 (e.g., belt, drum, wire, fabric, etc.) driven by rollers 260 and that is rotating as indicated by the arrow 262 in FIG. 2. The forming surface 258, driven by the rollers 260 rotating according to the arrows 262, moves in the machine direction. The merged streams of meltblown polymer fibers and secondary fibrous material 232 are collected as a coherent matrix of fibers on the surface of the forming surface 258 to form the coform nonwoven structure 254.

Deposition of the fibers may be aided by an under-wire vacuum supplied by a negative air pressure unit, or below wire exhaust system, 280 (as shown with respect to FIG. 4). The under-wire vacuum may have a number of zones, for example three zones, in the machine direction unlike conventional machines. Where three zones are employed, a first zone sits upstream in the machine direction of the formation zone 230, a second zone is directly below the nozzle 244 and formation zone 230, and a third zone is downstream in the machine direction of the formation zone 230. In exemplary aspects, the second zone has the highest airflow, the first zone has the smallest amount of airflow, and the third zone has higher airflow than the first zone, but less than the second zone. The zones may also supply the same amount of airflow if found to be optimal.

According to the above-described apparatus **210*a* and associated process, the secondary fibrous materials become interconnected by and held captive within the meltblown polymer fibers by mechanical entanglement of the polymer fibers with the secondary fibrous materials. The mechanical entanglement and interconnection of the polymer fibers and secondary fibrous materials alone are able to form a coherent integrated fiber structure (e.g. coform nonwoven structure 254**). The coherent integrated fiber structure may be formed by the polymer fibers and secondary fibrous materials without any adhesive or molecular or hydrogen bonds between the two different types of fibers.

As shown in FIG. 2, the method 200 may further employ a second apparatus **210*b* that is substantially similar to apparatus 210*a*. For instance, the apparatus 210*b* may include the same components (labeled similarly in FIG. 2 with respect to apparatus 210*b* as the same components within apparatus 210*a*). Additionally, the apparatus 210*b* may operate in a similar manner to the described operation of apparatus 210*a*. Of course, it is not the case that the apparatuses 210*a*, 210*b* must operate in the exact same fashion—for example, utilizing the exact same process settings. Rather, the settings—e.g. airflow speeds; material throughputs; vacuum levels; etc. may be varied between the apparatus 210*a*, 210*b*** to produce different coform structures having desired properties.

In relation to the nonwoven webs 100 of the present disclosure, the apparatuses **210*a*, 210*b* may operate together to produce described layered or homogenous web structures. According to the method 200, different fibers may be produced from the meltblowing dies 216 and 218 to help form the layered structure of the web 100 of FIG. 1. For example, in the method 200, the first die 216 of apparatus 210*a* may produce a stream 226 of bicomponent meltblown fibers 220, with the extruders 214, 214" feeding the die 216. The extruder 214 may extrude a first (or third) polymer component while the extruder 214" may extrude a secondary polymer component, the first (or third) and second polymer components coming together within the first die 216 to form bicomponent fibers. The extruder 214' may extrude the first polymer component, thus forming a stream 228 of homogenous meltblown fibers 221 as the first polymer component is forced through the second die 218. The stream 226 of meltblown bicomponent meltblown fibers 220 may form the bicomponent meltblown fibers 103 of the web 100 while the stream 228 of homogenous meltblown fibers 221 forms the homogenous meltblown fibers 105 of the web 100**.

As the stream 226 of bicomponent fibers 220 is located upstream relative to the secondary air stream 234 containing the secondary fibrous material 232, bicomponent meltblown fibers 220 are disposed at a higher concentration most closely to the forming surface 258 and forming a first outer region of the web structure 254—ultimately forming the first outer region 102 of the web 100. With the stream 228 of homogenous meltblown fibers 221 located downstream relative to the secondary air stream 234 containing the secondary fibrous material 232, homogenous meltblown fibers 221 are disposed at a higher concentration away from the forming surface 258 at a secondary (e.g. top) surface of the web structure 254.

The web structure 254 is an intermediate structure formed by apparatus **210*a* that is then transferred within the process according to method 200 to the apparatus 210*b*. The apparatus 210*b* may differ from the apparatus 210*a* in that the extruder 214' is positioned upstream relative to the secondary air stream 234 of the apparatus 210*b* while the extruders 214, 214" are positioned downstream of the secondary air stream 234 within apparatus 210*b*. Within the apparatus 210*b*, the extruder 214' and die 218**—similar to extruder 214' and die 218 of the apparatus 210*a*—is responsible for extruding the first polymer component and forming the homogenous meltblown fibers 221. The extruders 214, 214" and die 216 of apparatus 210*b*-again, similar to the extruders 214, 214" and die 216 of apparatus 210*a*—are responsible for extruding the first (or third) and second polymer components and forming the bicomponent meltblown fibers 220.

With the extruder 214' and die 218 of the second apparatus 210*b* positioned upstream of the secondary air stream 234 and the composite air and material stream 256 applying material onto the web structure 254 coming from the apparatus 210*a*, the homogenous meltblown fibers 221 formed by the second apparatus 210*b* are applied to the web structure 254 disposed at a higher concentration proximate the secondary surface of the web structure 254. In this manner, the combined material of the homogenous meltblown fibers 221 and the secondary fibrous material 232 of the first and second apparatuses 210*a*, 210*b* form the central region of the final web 100—as seen most clearly in FIG. 1. Accordingly, with the extruders 214, 214" and die 216 of the second apparatus 210*b* positioned downstream of the secondary air stream 234 and the composite air and material stream 256 applying material onto the web structure 254 coming from the apparatus 210*a*, the bicomponent meltblown fibers 220 formed by the second apparatus 210*b* are applied to the web structure 254 disposed at a higher concentration away from the secondary surface of the web structure 254. In this manner, the combined bicomponent meltblown fibers 220 and secondary fibrous material 232 of the second apparatus 210*b* forms an outer region of the formed web 100. With the bicomponent meltblown fibers 220, homogenous meltblown fibers 221, and secondary fibrous material 232 from the second apparatus 210*b* applied to the web structure 254, the nonwoven web 100 is formed.

Accordingly, the method 200 may be used to form a nonwoven web structure, such as nonwoven web 100, having a first outer region, a central region, and a second outer region, where the outer regions comprise higher concentrations of bicomponent meltblown fibers than in the central region. The central region comprises higher concentrations of homogenous meltblown fibers than either of the first and/or second outer regions. In some embodiments, the first and/or second outer regions may contain no homogenous meltblown fibers, and the central region may contain no bicomponent meltblown fibers.

The 'throughput' of the material(s) through the extruders 214, 214', 214" will influence the amount of material, e.g. homogenous/bicomponent fibers, coming from the dies 216, 218 in the final web 100. In this way, a basis weight of the bicomponent meltblown fibers 103 and the homogenous meltblown fibers 105 in the formed web 100 may be adjusted to different levels by adjusting the throughput of the polymer components through the extruders 214, 214', 214". For example, increasing the throughput of the first (or third) and second polymer components through and extruders 214, 214" and the die 216 would proportionally increase an amount of bicomponent meltblown fibers 220 in the streams 226, and thus the amount of bicomponent meltblown fibers 103 in a final, formed web 100. Likewise, increasing the throughput of the first polymer component through the extruder 214' and the die 218 would proportionally increase an amount of homogenous meltblown fibers 221 in the streams 228, and thus the amount of homogenous meltblown fibers 105 in a final, formed web 100. Decreasing throughput would accordingly decrease the relative amounts of the fibers 103, 105 in the final, formed web 100. Preferred relative amounts of the homogenous meltblown fibers 105 and the bicomponent meltblown fibers 103 and/or preferred relative amounts of the first and third polymer components and the second polymer component-which form the fibers 103, 105—have been detailed herein and such levels may be achieved by adjusting the throughputs of the polymer components through the extruders 214, 214', 214" and the dies 216, 218.

Further, increasing or decreasing the throughput of the first (or third) or second polymer components relative to each other through the extruders 214, 214" and the dies 216 can form bicomponent meltblown fibers having varying percentages of the first (or third) and second polymer components by total weight of the bicomponent meltblown fibers. For example, by adjusting the throughput of the second polymer component through the extruders 214" relative to the first (or third) polymer component through the extruders 214, an among of the second polymer component within the bicomponent meltblown fibers 220 (and thus, the bicomponent meltblown fibers 103 in the web 100) may be varied to be between about 1.5% and about 30% of the total weight of the bicomponent meltblown fibers, according to aspects of the present disclosure.

Other configurations of the apparatuses 210*a*, 210*b* are contemplated which may produce the nonwoven web structures according to aspects of the present disclosure. For example, apparatus 210*a* may comprise only dies 216 configured to form bicomponent meltblown fibers 220, while the apparatus 210*b* comprises both a die 216 and a die 218 to form both bicomponent meltblown fibers 220 and monocomponent meltblown fibers 221—with the die 216 disposed downstream of the die 218. In other embodiments, the apparatus 210*b* may comprise only dies 216 configured to form bicomponent meltblown fibers 220, while the apparatus 210*a* comprises both a die 216 and a die 218 to form both bicomponent meltblown fibers 220 and monocomponent meltblown fibers 221—with the die 216 disposed upstream of the die 218

Figure 3:
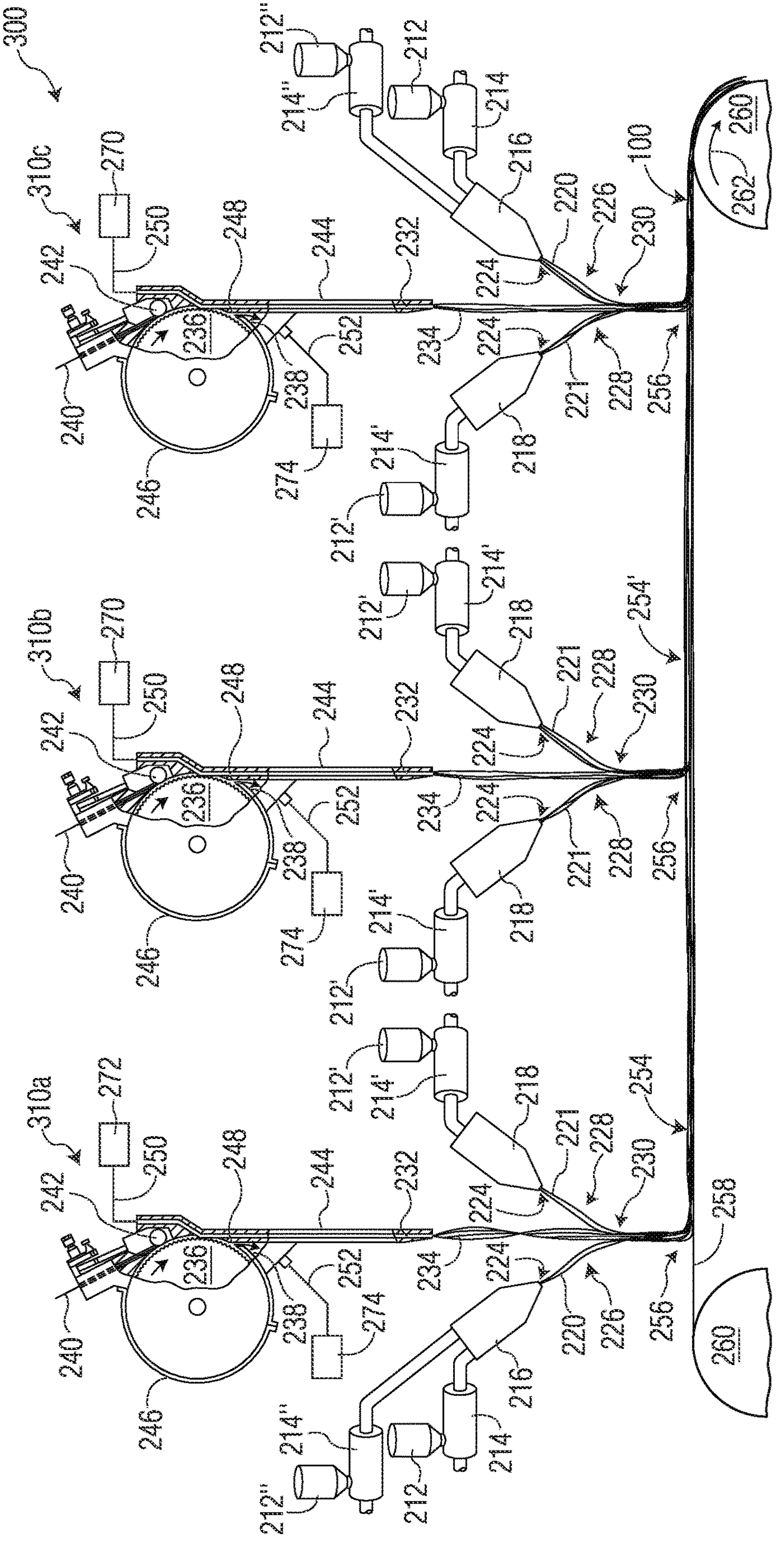
FIG. 3 is a schematic illustration an alternative embodiment of a method for forming nonwoven webs of the present disclosure.

Method 300 represents another process for forming nonwoven webs in accordance with the present disclosure. Method 300 is similar to method 200 except that method 300 employs three forming apparatuses 310*a*, 310*b*, and 310*c* as seen in FIG. 3. The apparatuses 310*a*, 310*b*, and 310*c* are each similar to apparatus 210*a* described previously. Similarly labeled components in the apparatuses 310*a*, 310*b*, and 310*c* are the same as the corresponding components described with respect to the apparatus 210*a*.

The method of FIG. 3 begins in a similar manner as the method 200. For example, the first die 216 of apparatus 310*a* is located upstream relative to the secondary air stream 234 and produces a stream 226 of bicomponent meltblown fibers 220, with the extruders 214, 214" feeding the die 216. With the stream 226 of bicomponent fibers 220 located upstream relative to the secondary air stream 234 containing the secondary fibrous material 232, bicomponent meltblown fibers 220 are disposed at a higher concentration most closely to the forming surface 258 forming a first outer region of the web structure 254—which ultimately forms a first outer region 102 of the web 100. As shown in FIG. 3, the stream 228 of homogenous meltblown fibers 221 in apparatus 310*a* is located downstream relative to the secondary air stream 234 containing the secondary fibrous material 232, and thus the homogenous meltblown fibers 221 formed by apparatus 310*a* are disposed at a higher concentration away from the forming surface 258 at a secondary (e.g. top) surface of the web structure 254.

The web structure 254 formed by apparatus 310*a* is transferred within the process according to method 300 to the apparatus 310*b*. The apparatus 310*b* differs from the apparatus 310*a* in that apparatus 310*b* forms a composite stream 256 combining streams of secondary fibrous material 232 and only homogenous meltblown fibers 221. For example, apparatus 310*b* is shown as having only extruders 214' and dies 218, through which the first polymer component is extruded and passed through dies 218 to form homogenous meltblown fibers 221. Accordingly, the composite fibrous material formed by the apparatus 310*b* and applied to the web structure 254 formed by the apparatus 310*a* comprises only secondary fibrous material 232 and homogenous meltblown fibers 221. In this manner, process 300 may be able to produce a larger (e.g. thicker; higher basis weight) central region 106 in formed nonwoven webs 100 according to the present disclosure. Although described here as utilizing the first polymer component in the extruders 214' of the apparatus 310*b*, it should be understood that a different polymer component (or polymer blend) may be employed for the apparatus 310*b* as used in the formation of the homogenous meltblown fibers of the apparatus 310*a* (and/or 310*c*).

After the material from the apparatus 310*b* has been applied to the web structure 254 formed by the apparatus 310*a*—forming a second intermediate structure 254'—the second intermediate structure 254' is fed to apparatus 310*c*. The apparatus 310*c* is similar to the apparatus 210*b* of method 200. For example, the apparatus 310*c* has an extruder 214' and die 218, which operate to form homogenous meltblown fibers 221, positioned upstream of the secondary air stream 234 of the apparatus 310*c*. The extruders 214, 214" and the die 216 are positioned downstream of the secondary air stream 234 of the apparatus 310*c*. Accordingly, the homogenous meltblown fibers 221 formed by the apparatus 310*c* are applied to the web structure 254' disposed at a higher concentration proximate the formed web structure 254' and contributing to the basis weight of the central region 106 in the final, formed web 100. Likewise, the homogenous meltblown fibers 221 formed by the apparatus 310*c* are applied to the web structure 254' disposed at a higher concentration away from the web structure 254' and form an outer region 102, 104 of the final, formed web 100.

Accordingly, the method 300 may be used to form a nonwoven web structure, such as nonwoven web 100, having a first outer region, a central region, and a second outer region, where the outer regions comprise higher concentrations of bicomponent meltblown fibers than in the central region. The central region comprises higher concentrations of homogenous meltblown fibers than either of the first and/or second outer regions. In some embodiments, the first and/or second outer regions may contain no homogenous meltblown fibers, and the central region may contain no bicomponent meltblown fibers. An advantage of the method 300 over the method 200 is that the method 300 may achieve higher basis weights for the central region than method 200 by having an entire forming apparatus (e.g. apparatus 310*b*) dedicated to forming a portion of the central region. In contrast, the method 200 relies on only a portion of two separate forming apparatuses to help form the central region.

Alternatives to the described method 300 are also within the scope of the present disclosure. In a first alternative method 300, rather than the first apparatus 310*a* forming both bicomponent meltblown fibers 220 and homogenous meltblown fibers 221, the first apparatus 310*a* may form only bicomponent meltblown fibers 220. Accordingly, in these embodiments, the first apparatus 310*a* would comprise extruders 214, 214" and dies 316 disposed on both sides (e.g. upstream and downstream) of the secondary air stream 234. The intermediate web structure 254 would then comprise only bicomponent meltblown fibers 220 and secondary fibrous material 232. In at least some of these embodiments, the third apparatus 310*c* may be similarly modified relative to the embodiment of FIG. 3 in that the apparatus 310*c* may form only bicomponent meltblown fibers 220. Accordingly, in such embodiments, the material applied to the intermediate web structure 254' would comprise only bicomponent meltblown fibers 220 and secondary fibrous material 232. Such alternative embodiments may be able to more discretely control the amounts and basis weights of the bicomponent meltblown fibers 220 and the homogenous meltblown fibers 221 which form the bicomponent meltblown fibers 103 and the homogenous meltblown fibers 105 of the web structure.

The process 200 or 300 may be modified in another way to produce alternative nonwoven webs 100. According to some aspects of the present disclosure, the forming apparatuses 210*a*, 210*b*, or 310*a-c* may each be configured to form bicomponent meltblown fibers 220 only, without any homogenous meltblown fibers 221. In this manner, the process 200 or 300 may be utilized to form homogenous, rather than layered, nonwoven webs 100. Such nonwoven webs 100 may be similar to the web 100 of FIG. 1, except that such webs would have no homogenous meltblown fibers 105 and would have bicomponent meltblown fibers 103 disposed throughout the thickness of the web 100 structure in a relatively homogenous disposition. Such modified processes were utilized to form the HE1-3 example webs described herein.

It should be understood that the present disclosure is by no means limited to the above-described embodiments. In an alternative embodiment, for example, first and second meltblowing die heads may be employed that extend substantially across a forming surface in a direction that is substantially transverse to the direction of movement of the forming surface. The die heads may likewise be arranged in a substantially vertical disposition, i.e., perpendicular to the forming surface, so that the thus-produced meltblown fibers are blown directly down onto the forming surface. Such a configuration is well known in the art and described in more detail in, for instance, U.S. Patent Application Publication No. 2007/0049153 to Dunbar, et al. Furthermore, although the above-described embodiments employ multiple meltblowing die heads to produce fibers of differing sizes, a single die head may also be employed. An example of such a process is described, for instance, in U.S. Pat. No. 7,168,932 to Lassig, et al., which is incorporated herein in its entirety by reference thereto for all purposes.

Desirably, the fibrous nonwoven web 100 may be used as a wet wipe which contains a liquid. The liquid can be any solution which can be absorbed into the wet wipe basesheet (e.g. web 100) and may include any suitable components which provide the desired wiping properties. For example, the components may include water, emollients, surfactants, fragrances, preservatives, chelating agents, pH buffers or combinations thereof as are well known to those skilled in the art. The liquid may also contain lotions, medicaments, and/or other active agents.

The amount of liquid contained within each wet wipe may vary depending upon the type of material being used to provide the wet wipe, the type of liquid being used, the type of container being used to store the wet wipes, and the desired end use of the wet wipe. Generally, each wet wipe can contain from about 150 to about 600 weight percent and desirably from about 250 to about 450 weight percent liquid based on the dry weight of the wipe for improved wiping. In a particular aspect, the amount of liquid contained within the wet wipe is from about 300 to about 400 weight percent based on the dry weight of the wet wipe. If the amount of liquid is less than the above-identified ranges, the wet wipe may be too dry and may not adequately perform. If the amount of liquid is greater than the above-identified ranges, the wet wipe may be oversaturated and soggy and the liquid may pool in the bottom of the container.

Each wet wipe may be generally rectangular in shape and may have any suitable unfolded width and length. For example, the wet wipe may have an unfolded length of from about 2.0 to about 80.0 centimeters and desirably from about 10.0 to about 25.0 centimeters and an unfolded width of from about 2.0 to about 80.0 centimeters and desirably from about 10.0 to about 25.0 centimeters. Typically, each individual wet wipe is arranged in a folded configuration and stacked one on top of the other or a continuous strip of material which has perforations to provide a stack of wet wipes. The stack of wet wipes may be placed in the interior of a container, such as a plastic tub, and arranged in a stack for dispensing to provide a package of wet wipes for eventual sale to the consumer.

The nonwoven web 100 of the present disclosure may alternatively be used in a wide variety of articles. For example, the web 100 may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, and so forth; medical absorbent articles, such as garments, fenestration materials, underpads, bedpads, bandages, absorbent drapes, and medical wipes; clothing articles; pouches; and so forth. Materials and processes suitable for forming such articles are well known to those skilled in the art. Several examples of such absorbent articles are described in U.S. Pat. No. 5,649,916 to DiPalma, et al.; U.S. Pat. No. 6,110,158 to Kielpikowski; U.S. Pat. No. 6,663,611 to Blaney, et al., which are incorporated herein in their entirety by reference thereto for all purposes. Still other suitable articles are described in U.S. Patent Application Publication No. 2004/0060112 A1 to Fell et al., as well as U.S. Pat. No. 4,886,512 to Damico et al.; U.S. Pat. No. 5,558,659 to Sherrod et al.; U.S. Pat. No. 6,888,044 to Fell et al.; and U.S. Pat. No. 6,511,465 to Freiburger et al., all of which are incorporated herein in their entirety by reference thereto for all purposes. When employed in the absorbent article, the nonwoven web 100 of the present disclosure may form a component of the absorbent core or any other absorbent component of the absorbent article as is well known in the art.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto. In addition, it should be noted that any given range presented herein is intended to include any and all lesser included ranges. For example, a range of from 45-90 would also include 50-90; 45-80; 46-89 and the like.

CDT Strength Test Method

The CDT Strength Test Method measures the peak load value—the maximum force produced by a specimen when it is pulled to break. The samples are cut to a width of 25 mm and a length of 152 mm using a die cutter or using a sample cutter such as a JDC Precision Sample Cutter (Thwing-Albert Instrument Company, Philadelphia, Pa., Model No. JDC 3-10, Ser. No. 37333) and conditioned at 23±2° C. and 50±5% relative humidity for at least 4 hours before testing and are tested at the same ambient conditions. The length dimension of the sample should extend in a cross-machine direction of the web from which the sample is cut. The CDT Strength value is the peak load in grams-force when a sample is pulled to rupture. More specifically, the CDT Strength value is the peak load when the sample is pulled with a force oriented in a direction crosswise to the machine-direction orientation of the sample.

The tensile strength test instrument is an MTS Criterion 41 or 43 and MTS TestSuite Elite™ (MTS Systems Corp., Research Triangle Park, NC). The load cell is selected such that the peak load values fall between 10 and 90 percent of the load cell's full-scale load-either a 50 Newton or 100 Newton maximum load cell may typically be appropriate depending on the strength of the sample being tested. The gauge length is 76 mm, and the jaw width is 76 mm with an approximate height of 12.7 mm. The crosshead speed is 305 mm/minute, and the break sensitivity is set at 70%. The sample is placed in the jaws of the instrument and centered both vertically and horizontally with the longer dimension parallel to the direction of the load application. The jaws are operated using pneumatic-action and are rubber coated. The test is then started and ends when the specimen breaks. The peak load is determined and reported as the CDT Strength value of the sample, to the nearest 0.1 gf. Five (5) representative specimens are tested, and the arithmetic average of all individual specimen tested is the tensile strength for the product.

TS7 Softness Test Method

Softness of the nonwoven webs were measured using an EMTEC Tissue Softness Analyzer ("TSA") (Emtec Electronic GmbH, Leipzig, Germany) and in particular the TS7 value. The TSA comprises a rotor with vertical blades which rotate on the test piece applying a defined contact pressure. Contact between the vertical blades and the test piece creates vibrations, which are sensed by a vibration sensor. The sensor then transmits a signal to a PC for processing and display. The signal is displayed as a frequency spectrum. For measurement of TS7 values, the blades are pressed against sample with a load of 100 mN and the rotational speed of the blades is 2 revolutions per second.

To measure TS7 values, a frequency analysis is performed in the range of approximately 1 KHz to 10 kHz, with the amplitude of the peak occurring at 7 kHz being recorded as the TS7 value. The TS7 value represents the softness of the sample and a lower amplitude correlates to a softer sample. The TS7 values have the units dB V2 rms.

Test samples were prepared by cutting a circular sample having a diameter of 112.8 mm. All samples were allowed to equilibrate at TAPPI standard temperature and humidity conditions for at least 24 hours prior to completing the TSA testing. The sample is placed in the TSA with the air side of the sample facing upward (the side of the sample collected on the forming wire facing downward). The sample is secured, and the measurements are started via the PC. The PC records, processes and stores all of the data according to standard TSA protocol. The reported values are the average of 5 replicates, each one with a new sample.

Cup Crush Test Method

Figure 7:
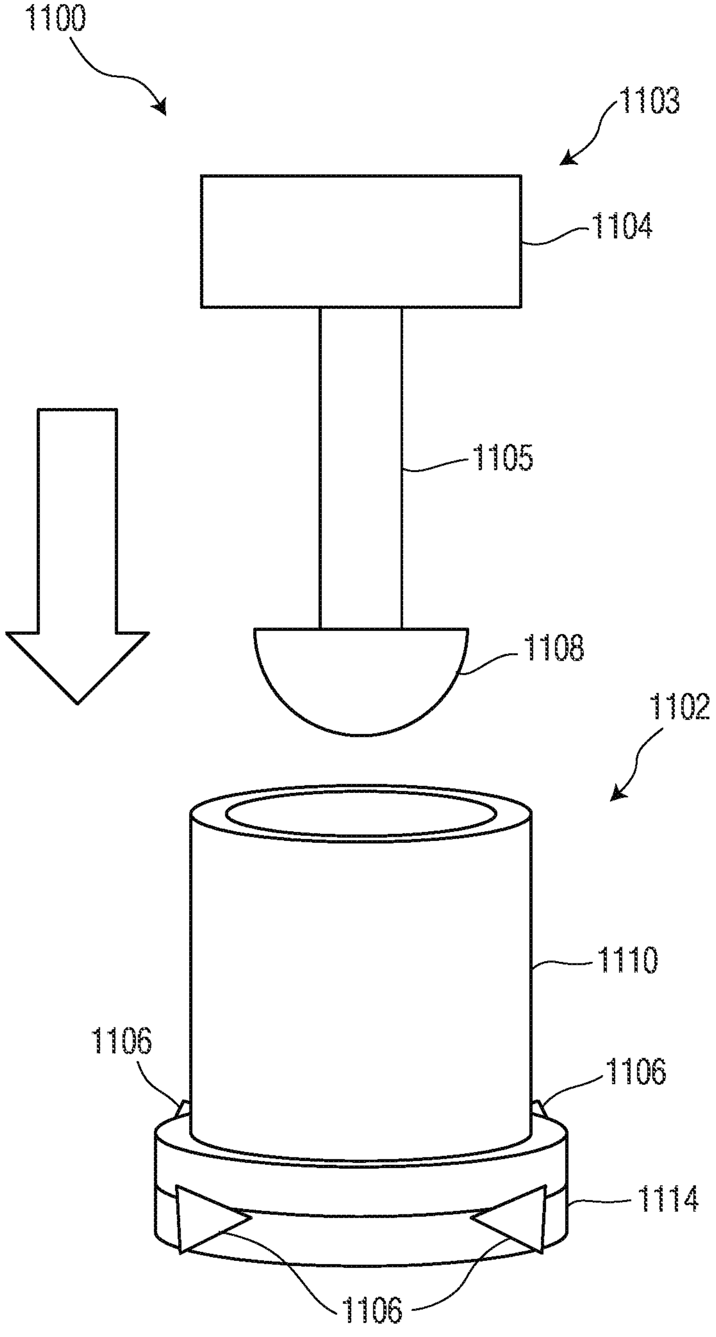
FIGS. 7 and 8 show a cup-crush testing system that includes a cup forming assembly.
Figure 8:
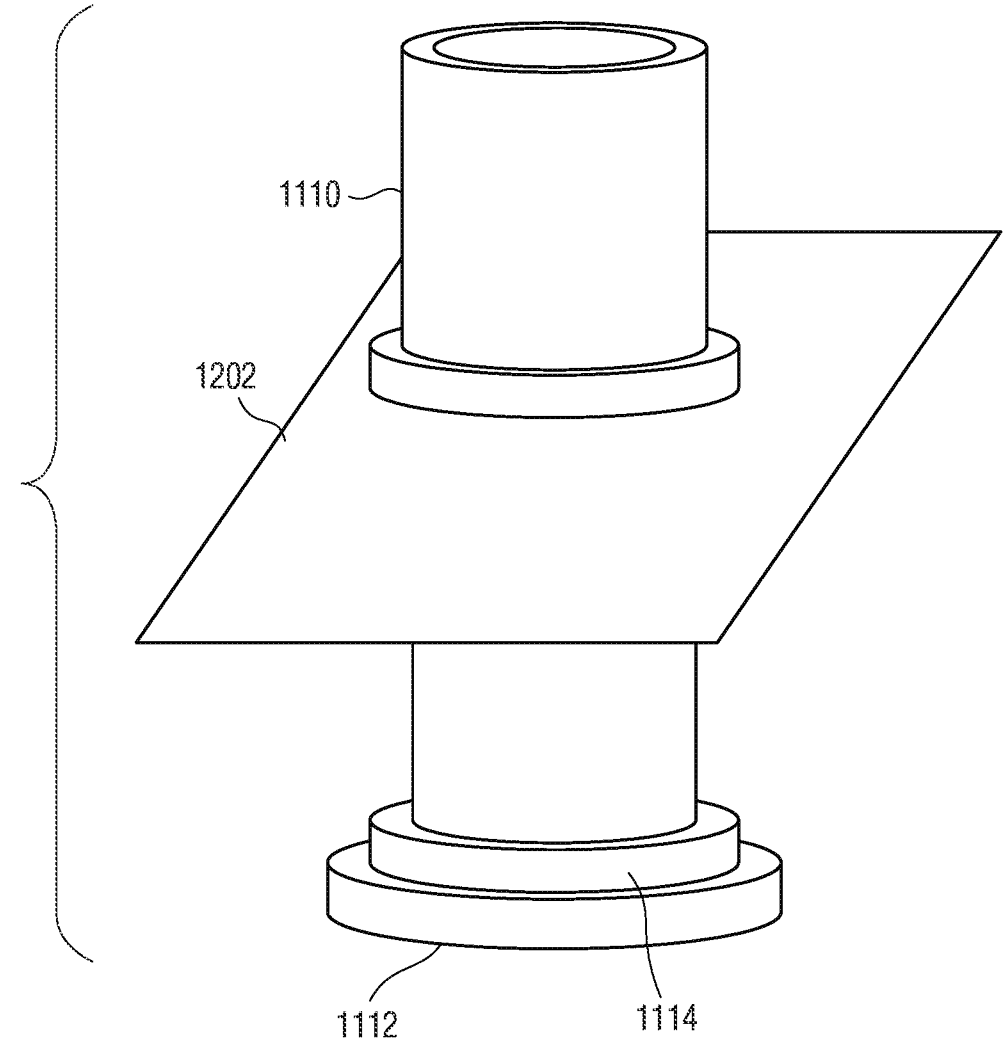

As used herein, the term "cup crush" refers to one measure of the softness of a nonwoven fabric sheet that is determined according to the cup crush test. The cup crush test evaluates fabric stiffness by measuring the peak load (also called the “cup crush load” or just “cup crush”) and the energy required to crush a specimen and in turn quantify softness of the specimen. FIGS. 7 and 8 show a cup-crush testing system 1100 which includes a cup forming assembly 1102. The system further includes a hemispherical foot 1108 having a 45 mm diameter (formed of lightweight nylon or metal) that is positioned at the free end of a rod 1105. The specimens were prepared by cutting samples into squares having 178 mm sides—for example using a die cutter or a sample cutter such as a JDC Precision Sample Cutter (Thwing-Albert Instrument Company, Philadelphia, Pa., Model No. JDC 3-10, Ser. No. 37333). The samples should be conditioned at, and the test conducted at, a standard laboratory atmosphere of 23±2° C. and 50±5% relative humidity.

The assembly 1102 includes mating, top-hat shaped forming cups 1110 and 1112, which grip a sheet 1202 (e.g. the sample), at least at four points. The forming cup 1110 has a diameter of 65 mm and is 65 mm tall. To form the assembly 1102, the sheet 1202 is placed over the forming cup 1112 with a gripping ring positioned on the forming cup 1112. The forming cup 1110 is placed over the sheet 1202 and slowly slid down the forming cup 1112, to conform the sample 1112 into a cup shape. The forming cup 1110 is slid until contacting the ring 1114 with the four corners 1106 of sheet 1202 extending outside of the assembly 1102 and pinched between the ring 1114 and the cup 1110. The cup 1112 is removed after forming sheet 1202 into the cup shape. There can be gaps between the ring 1114 and forming cup 1110, but at least four corners 1106 must be fixedly pinched therebetween.

The forming cup 1110 and the sheet 1202, retained in forming cup 1110 by the gripper ring 1114, and the specimen are then placed on a load plate which is mounted on a tensile tester. The constant rate of extension tensile tester may be a MTS Criterion 42 is equipped with a computerized data-acquisition system (such as MTS TestSuite Elite™, from MTS Systems Corp., Research Triangle Park, NC) that is capable of calculating peak load and energy, preferably at a minimum data capture rate of 20 data points per second, between two pre-determined distances (15-60 millimeters) in a compression mode.

The foot 1108 and cup 1110 are aligned to avoid contract between the cup walls and the foot that could affect the readings. The foot 1108 is positioned at approximately 75 mm from the load plate (e.g. the gage length). The crosshead speed is set to 406.4 mm/minute, and to capture data the foot 1108 descends through the open end of the forming cup 1110 and “crushes” and distorts the cup-shaped sheet 1202 inside. Peak load between 15 mm and 60 mm of travel of the foot 1108 from start as measured by the tensile tester connected to a PC is recorded in grams force (gf) and Energy, measured in grams force-length (gf-mm). The foot 1108 is set to travel to at least 62 mm from start to ensure data is captured at 60 mm of travel. The results are a manifestation of the stiffness of the material. The stiffer the material, the higher the peak load and energy values. The softer the material, the lower the values.

Example Embodiments

Embodiment 1: A nonwoven web material may comprise a first outer region comprising: first meltblown polymer fibers, the first meltblown polymer fibers comprising a first polymer component and a second polymer component, and absorbent fibers, wherein the second polymer component content of the first meltblown polymer fibers comprises greater than 0% and less than or equal to 20% by weight of a total polymeric material content of the first meltblown polymer fibers; a second outer region comprising: second meltblown polymer fibers, the second meltblown polymer fibers comprising a first polymer component and a second polymer component, and absorbent fibers, wherein the second polymer component content of the second meltblown polymer fibers comprises greater than 0% and less than or equal to 20% by weight of a total polymeric material content of the second meltblown polymer fibers; and a central region disposed between the first outer region and the second outer region, the central region comprising: third meltblown polymer fibers, the third meltblown polymer fibers being different than the first meltblown polymer fibers and the second meltblown polymer fibers and not comprising the second polymer component, and absorbent fibers.

Embodiment 2: The nonwoven web material of embodiment 1, wherein the second polymer component of the first meltblown polymer fibers and the second meltblown polymer fibers may be the same.

Embodiment 3: The nonwoven web material of any one of embodiments 1 or 2, wherein the second polymer component of the first meltblown polymer fibers and the second polymer component of the second meltblown polymer fibers may be polyethylene.

Embodiment 4: The nonwoven web material of any one of embodiments 1-3, wherein the third meltblown polymer fibers of the central region may comprise monocomponent fibers.

Embodiment 5: The nonwoven web material of embodiment 4, wherein the third meltblown fibers may be formed of the first polymer component.

Embodiment 6: The nonwoven web material of any one of embodiments 1-5, wherein the first meltblown polymer fibers and the second meltblown polymer fibers comprise bicomponent meltblown fibers, and wherein the second polymer component substantially surrounds and covers the first polymer component of the bicomponent meltblown fibers.

Embodiment 7: The nonwoven web material of any one of embodiments 1-6, wherein the first meltblown polymer fibers in the first outer region comprise bicomponent polymer fibers formed of polypropylene and the second polymer component.

Embodiment 8: The nonwoven web material of any one of embodiments 1-7, wherein the second polymer component content of the first meltblown polymer fibers comprises greater than 0% and less than or equal to 15%, by weight of a total polymeric content of the first meltblown polymer fibers. Embodiment 9: The nonwoven web material of any one of embodiments 1-8, wherein a combined second polymer component content of the first meltblown polymer fibers and the second meltblown polymer fibers comprises greater than or equal to 0% and less than or equal to 4% by weight of a total weight of the nonwoven web material.

Embodiment 10: The nonwoven web material of embodiment 9, wherein a combined basis weight of the first meltblown polymer fibers is greater than or equal to 3% and less than or equal to 20% of an overall basis weight of the nonwoven web material, and wherein the basis weight of the third meltblown polymer fibers is greater than or equal to 17% and less than or equal to 37% of the overall basis weight of the nonwoven web material.

Embodiment 11: The nonwoven web material of any one of embodiments 1-10, wherein the nonwoven web material has an overall basis weight of greater than or equal to 45 gsm and less than or equal to 80 gsm, and wherein a basis weight of the central region is greater than or equal to 50% and less than or equal to 85% of an overall basis weight of the nonwoven web.

Embodiment 12: The nonwoven web material of any one of embodiments 1-11, wherein the first outer region, the central region, and the second outer region each comprise separate coformed layers where the meltblown polymer fibers and the absorbent fibers are intermixed prior to deposition onto a forming screen.

Embodiment 13: A stratified coformed nonwoven web material having a thickness may comprise a first outer region comprising a combination of meltblown polymer fibers and absorbent fibers; a second outer region comprising a combination of meltblown polymer fibers and absorbent fibers; and a central region disposed between the first outer region and the second outer region, the central region comprising a combination of meltblown polymer fibers and absorbent fibers, wherein at least some of the meltblown polymer fibers comprise bicomponent meltblown polymer fibers and at least some of the meltblown polymer fibers comprise monocomponent meltblown polymer fibers, the bicomponent meltblown polymer fibers extending through less than the entire thickness of the stratified coformed nonwoven web.

Embodiment 14: The stratified coformed nonwoven web material of embodiment 13, wherein the bicomponent meltblown polymer fibers comprise a first polymer component and a second polymer component, and wherein the second polymer component comprises greater than 0% and less than or equal to 20%, by weight of a total polymeric material content of the bicomponent meltblown polymer fibers.

Embodiment 15: The stratified coformed nonwoven web material of embodiment 14, wherein a polyethylene content of the meltblown polymer fibers of the stratified coformed nonwoven web material comprises greater than 0% and less than or equal to 3%, by weight of a total weight of the stratified coformed nonwoven web material.

Embodiment 16: The stratified coformed nonwoven web material of any one of embodiments 13-15, wherein the bicomponent polymer meltblown fibers comprise a first polymer component and a second polymer component, and wherein the second polymer component comprises greater than 0% and less than or equal to 15%, by weight of a total polymeric material content of the bicomponent meltblown polymer fibers.

Embodiment 17: The stratified coformed nonwoven web material of any one of embodiments 13-16, wherein the meltblown polymer fibers of the first outer region and the second outer region comprise bicomponent polymer fibers, and wherein the meltblown polymer fibers of the inner region comprise polymer monocomponent fibers and do not comprise any bicomponent polymer fibers.

Embodiment 18: The stratified coformed nonwoven web material of embodiment 17, wherein the monocomponent polymer fibers of the inner region are formed of polypropylene.

Embodiment 19: The stratified coformed nonwoven web material of any one of embodiments 14-18, wherein the bicomponent meltblown polymer fibers comprise a first polymer component of polyethylene and a second polymer component of polypropylene.

Embodiment 20: A stratified coform web material having an overall basis weight and may comprise a first coformed outer region comprising meltblown polymer fibers, the meltblown polymer fibers comprising bicomponent meltblown polymer fibers formed of a first polymer component and a second polymer component, the second polymer component present in an amount greater than 0% and less than or equal to 3% of the overall basis weight of the stratified coform web material and comprising less than or equal to 40% of a total polymeric content of the bicomponent meltblown polymer fibers in the first coformed outer region, and absorbent fibers; a second coformed outer region comprising: meltblown polymer fibers, the meltblown polymer fibers comprising bicomponent meltblown polymer fibers formed of a first polymer component and a second polymer component, the second polymer component present in an amount greater than 0% and less than or equal to 3% of the overall basis weight of the stratified coform web material and comprising less than or equal to 40% of a total polymeric content of the bicomponent meltblown polymer fibers in the second coformed outer region, and absorbent fibers; and a central coformed region disposed between the first coformed outer region and the second coformed outer region, the central coformed region having a basis weight greater than or equal to 40% and less than or equal to 60% of the overall basis weight of the stratified coform web material and comprising: meltblown polymer fibers, the meltblown polymer fibers comprising monocomponent meltblown polymer fibers, and absorbent fibers.

Embodiment 21: The stratified coform web material of embodiment 20, wherein, in the first coformed outer region, the second polymer component comprises less than or equal to 20% of a total polymeric content of the bicomponent meltblown polymer fibers of the first coformed outer region, and wherein, in the second coformed outer region, the second polymer component comprises less than 20% of a total polymeric content of the bicomponent meltblown polymer fibers of the second coformed outer region.

Embodiment 22: The stratified coform web material of any one of embodiments 20 or 21, wherein, in both the first coformed outer region and the second coformed outer region, the first polymer component is polypropylene and the second polymer component is polyethylene.

Embodiment 23: The stratified coform web material of any one of embodiments 20-22, wherein the bicomponent meltblown polymer fibers have a core-sheath cross-section configuration where the second polymer component surrounds and covers the first polymer component.

Embodiment 24: The stratified coform web material of any one of embodiments 20-23, wherein the meltblown polymer fibers in the first outer region are present in an amount greater than or equal to 25% and less than or equal to 40% of the overall basis weight of the stratified coform web material, and the absorbent fibers in the first outer region are present in an amount greater than or equal to 60% and less than or equal to 75% of the overall basis weight of the stratified coform web material.

Embodiment 25: The stratified coform web material of any one of embodiments 20-24, wherein the stratified coform web material has a TS7 Softness value of less than or equal to 4.0, according to the TS7 Softness Test Method, and a CDT Strength value of greater than or equal to 228 gf, according to the CDT Strength Test Method.

Embodiment 26: The stratified coform nonwoven web material of embodiment 25, wherein the stratified coform web material has a Cup Crush Flexibility value of less than or equal to 1400 gf*mm.

Embodiment 27: A nonwoven web material may comprise first meltblown polymer fibers comprising a first polymer component and a second polymer component; and absorbent fibers; wherein the first meltblown polymer fibers are disposed throughout the nonwoven web material, and wherein the second polymer component content of the first meltblown polymer fibers comprises greater than 0% and less than or equal to 20% by weight of a total polymeric material content of the first meltblown polymer fibers.

Embodiment 28: The nonwoven web material of embodiment 27, wherein the second polymer component content of the first meltblown polymer fibers comprises greater than or equal to 5% and less than or equal to 15%, by weight of a total polymeric content of the first meltblown polymer fibers.

Embodiment 29: The nonwoven web material of any one of embodiments 27 or 28, wherein the second polymer component content of the first meltblown polymer fibers comprises greater than or equal to 10% and less than or equal to 20%, by weight of a total polymeric content of the first meltblown polymer fibers.

Embodiment 30: The nonwoven web material of any one of embodiments 27-29, wherein the first meltblown polymer fibers comprise bicomponent fibers, and wherein the bicomponent fibers have a core-sheath cross-section configuration where the second polymer component surrounds and covers the first polymer component.

Embodiment 31: The nonwoven web material of any one of embodiments 27-30, further comprising second meltblown polymer fibers comprising monocomponent fibers formed of the first polymer component or a third polymer component different than either of the first polymer component and the second polymer component.

Embodiment 32: The nonwoven web material of any one of embodiments 27-31, wherein the second polymer component of the first meltblown polymer fibers is polyethylene.

Embodiment 33: The nonwoven web material of any one of embodiments 27-32, wherein the first meltblown polymer fibers comprise bicomponent fibers formed of polypropylene and the second polymer component.

Embodiment 34: The nonwoven web material of any one of embodiments 27-33, wherein the second polymer component content of the first meltblown polymer fibers comprises greater than or equal to 0% and less than or equal to 8% by weight of a total weight of the nonwoven web material.

Embodiment 35: The nonwoven web material of any one of embodiments 27-34, wherein the second polymer component content of the first meltblown polymer fibers comprises greater than or equal to 4% and less than or equal to 8% by weight of a total weight of the nonwoven web material.

Embodiment 36: The nonwoven web material of any one of embodiments 27-35, wherein the nonwoven web material has an overall basis weight of between 45 gsm and 80 gsm, and wherein a basis weight of the first meltblown fibers is greater than or equal to 30% and less than or equal to 50% of an overall basis weight of the nonwoven web.

Embodiment 37: The nonwoven web material of any one of embodiments 27-36, wherein the first meltblown fibers are present in an amount greater than or equal to 13 gsm and less than or equal to 40 gsm and the absorbent fibers are present in an amount greater than or equal to 23 gsm and less than or equal to 56 gsm.

Embodiment 38: The nonwoven web material of any one of embodiments 27-37, wherein the nonwoven web material has a TS7 Softness value of less than or equal to 4.0, according to the TS7 Softness Test Method, and a CDT Strength value of greater than or equal to 237 gf, according to the CDT Strength Test Method.

Embodiment 39: The nonwoven web material of any one of embodiments 27-38, wherein the nonwoven web material has a TS7 Softness value of less than or equal to 4.0, according to the TS7 Softness Test Method, and a CDT Strength value of greater than or equal to 237 gf and less than or equal to 347 gf, according to the CDT Strength Test Method.

Embodiment 40: The nonwoven web material of any one of embodiments 27-39, wherein the nonwoven web material has a TS7 Softness value of less than or equal to 4.66 and greater than or equal to 3.47, according to the TS7 Softness Test Method, and a CDT Strength value of greater than or equal to 237 gf and less than or equal to 347 gf, according to the CDT Strength Test Method.

Embodiment 41: The nonwoven web material of any one of embodiments 27-40, wherein the nonwoven web material has a TS7 Softness value of less than or equal to 4.0 and greater than or equal to 3.47, according to the TS7 Softness Test Method, and a CDT Strength value of greater than or equal to 237 gf and less than or equal to 325 gf, according to the CDT Strength Test Method.

Embodiment 41: A method of forming a nonwoven web material may comprise merging a first stream of an absorbent material with one or more first streams of meltblown polymer fibers to form a first composite stream, the one or more first streams of meltblown polymer fibers comprising bicomponent fibers formed of a first polymer component and a second polymer component; collecting the first composite stream onto a forming surface; merging a second stream of an absorbent material with one or more second streams of meltblown polymer fibers to form a second composite stream, the one or more second streams of meltblown polymer fibers comprising bicomponent fibers formed of the first polymer component and the second polymer component; and collecting the second composite stream onto the collected first composite stream disposed on the forming surface, wherein the second polymer component content of the bicomponent fibers forms greater than 0% and less than or equal to 20% by weight of a total polymeric material content of the bicomponent fibers.

Embodiment 42: The method of embodiment 41, wherein an overall basis weight of the second polymer component within the nonwoven web material is greater than or equal to 2% and less than or equal to 15% of an overall basis weight of the nonwoven web material.

Embodiment 43: The method of any one of embodiments 41 or 42, wherein an overall basis weight of the second polymer component within the nonwoven web material is greater than or equal to 4% and less than or equal to 10% of an overall basis weight of the nonwoven web material.

Embodiment 44: The method of any one of embodiments 41-43, wherein an overall basis weight of the second polymer component within the nonwoven web material is greater than or equal to 4% and less than or equal to 8% of an overall basis weight of the nonwoven web material.

Embodiment 45: The method of any one of embodiments 42-44, wherein a basis weight of the meltblown fibers of the collected first composite stream is greater than or equal to 20% % and less than or equal to 40% % of an overall basis weight of the collected first composite stream.

Embodiment 46: The method of any one of embodiments 41-45, wherein a basis weight of the collected first composite stream is greater than or equal to 15% and less than or equal to 85% of an overall basis weight of the nonwoven web material.

Embodiment 47: The method of any one of embodiments 41-46, wherein a basis weight of the collected second composite stream is greater than or equal to 15% and less than or equal to 85% of an overall basis weight of the nonwoven web material.

Embodiment 48: The method of any one of embodiments 41-47, wherein the second polymer component content of the bicomponent fibers comprises greater than or equal to 5% and less than or equal to 15% by weight of a total polymeric content of the bicomponent fibers.

Embodiment 49: The method of any one of embodiments 41-48, further comprising merging a third stream of an absorbent material with one or more third streams of meltblown polymer fibers to form a third composite stream, the one or more third streams of meltblown polymer fibers comprising bicomponent fibers formed of the first polymer component and the second polymer component; and collecting the third composite stream onto the collected second composite stream disposed on the forming surface.

Embodiment 50: The method of embodiment 49, wherein a basis weight of the meltblown polymer fibers of the collected first composite stream is greater than or equal to 2% % and less than or equal to 15% % of an overall basis weight of the collected first composite stream, wherein a basis weight of the meltblown polymer fibers of the collected second composite stream is greater than or equal to 2% % and less than or equal to 15% % of an overall basis weight of the collected first composite stream, wherein a basis weight of the meltblown polymer fibers of the collected third composite stream is greater than or equal to 2% % and less than or equal to 15% % of an overall basis weight of the collected first composite stream.

Embodiment 51: The method of any one of embodiments 41-50, wherein a basis weight of the collected first composite stream is greater than or equal to 20% and less than or equal to 40% of an overall basis weight of the nonwoven web material.

Embodiment 52: The method of any one of embodiments 41-51, wherein a basis weight of the collected second composite stream is greater than or equal to 20% and less than or equal to 60% of an overall basis weight of the nonwoven web material.

What is claimed is:

1. A nonwoven web material comprising:

a first outer region comprising:

first meltblown polymer fibers, the first meltblown polymer fibers comprising a first polymer component and a second polymer component, and absorbent fibers, wherein the second polymer component content of the first meltblown polymer fibers comprises greater than 0% and less than or equal to 20% by weight of a total polymeric material content of the first meltblown polymer fibers;

a second outer region comprising:

second meltblown polymer fibers, the second meltblown polymer fibers comprising a first polymer component and a second polymer component, and absorbent fibers, wherein the second polymer component content of the second meltblown polymer fibers comprises greater than 0% and less than or equal to 20% by weight of a total polymeric material content of the second meltblown polymer fibers; and a central region disposed between the first outer region and the second outer region, the central region comprising:

third meltblown polymer fibers, the third meltblown polymer fibers being different than the first meltblown polymer fibers and the second meltblown polymer fibers and not comprising the second polymer component of the first meltblown polymer fiber or the second meltblown polymer fiber, and absorbent fibers.

2. The nonwoven web material of claim 1, wherein the second polymer component of the first meltblown polymer fibers and the second meltblown polymer fibers is the same.

3. The nonwoven web material of claim 1, wherein the second polymer component of the first meltblown polymer fibers and the second polymer component of the second meltblown polymer fibers is polyethylene.

4. The nonwoven web material of claim 1, wherein the third meltblown polymer fibers of the central region comprise monocomponent fibers.

5. The nonwoven web material of claim 4, wherein the third meltblown fibers are formed of the first polymer component.

6. The nonwoven web material of claim 1, wherein the first meltblown polymer fibers and the second meltblown polymer fibers comprise bicomponent meltblown fibers, and wherein the second polymer component substantially surrounds and covers the first polymer component of the bicomponent meltblown fibers.

7. The nonwoven web material of claim 1, wherein the first meltblown polymer fibers in the first outer region comprise bicomponent polymer fibers formed of polypropylene and the second polymer component.

8. The nonwoven web material of claim 1, wherein the second polymer component content of the first meltblown polymer fibers comprises greater than 0% and less than or equal to 15%, by weight of a total polymeric content of the first meltblown polymer fibers.

9. The nonwoven web material of claim 1, wherein a combined second polymer component content of the first meltblown polymer fibers and the second meltblown polymer fibers comprises greater than or equal to 0% and less than or equal to 4% by weight of a total weight of the nonwoven web material.

10. The nonwoven web material of claim 9, wherein a combined basis weight of the first meltblown polymer fibers is greater than or equal to 3% and less than or equal to 20% of an overall basis weight of the nonwoven web material, and wherein the basis weight of the third meltblown polymer fibers is greater than or equal to 17% and less than or equal to 37% of the overall basis weight of the nonwoven web material.

11. The nonwoven web material of claim 1, wherein the nonwoven web material has an overall basis weight of greater than or equal to 45 gsm and less than or equal to 80 gsm, and wherein a basis weight of the central region is greater than or equal to 50% and less than or equal to 85% of an overall basis weight of the nonwoven web.

12. The nonwoven web material of claim 1, wherein the first outer region, the central region, and the second outer region each comprise separate coformed layers where the meltblown polymer fibers and the absorbent fibers are intermixed prior to deposition onto a forming screen.

* * * * *